(12) United States Patent
Farhi et al.

(10) Patent No.: US 11,970,046 B1
(45) Date of Patent: Apr. 30, 2024

(54) COMPUTERIZED VEHICLE CONTROLLER AND ROUTING METHOD FOR A VEHICLE

(71) Applicants: Robby Farhi, Ariel (IL); Eduard Palko, Ariel (IL)

(72) Inventors: Robby Farhi, Ariel (IL); Eduard Palko, Ariel (IL)

(73) Assignees: Robby Farhi, Ariel (IL); Eduard Palko, Ariel (IL)

( * ) Notice: Subject to any disclaimer, the term of this patent is extended or adjusted under 35 U.S.C. 154(b) by 0 days.

(21) Appl. No.: 18/234,518

(22) Filed: Aug. 16, 2023

Related U.S. Application Data

(63) Continuation of application No. 16/765,432, filed as application No. PCT/IL2018/051100 on Oct. 11, 2018.

(30) Foreign Application Priority Data

Nov. 27, 2017 (IL) .......................................... 255950

(51) Int. Cl.
*B60H 1/00* (2006.01)
(52) U.S. Cl.
CPC ..... *B60H 1/00878* (2013.01); *B60H 1/00807* (2013.01); *B60H 1/00821* (2013.01); *B60H 2001/0015* (2013.01)

(58) Field of Classification Search
CPC ............ B60H 1/00878; B60H 1/00807; B60H 1/00821; B60H 2001/0015
See application file for complete search history.

(56) References Cited

U.S. PATENT DOCUMENTS

| | | |
|---|---|---|
| 3,844,130 A | 10/1974 | Wahnish |
| 3,866,433 A | 2/1975 | Krug |
| 4,531,379 A | 7/1985 | Diefenthal |
| 4,846,327 A | 7/1989 | Mayer |
| 5,333,678 A | 8/1994 | Mellum |
| 2003/0013405 A1 | 1/2003 | Guilford |
| 2004/0250560 A1 | 12/2004 | Ikura et al. |
| 2007/0068667 A1 | 3/2007 | Greer |
| 2008/0006045 A1 | 1/2008 | Brummett |
| 2008/0093143 A1 | 4/2008 | Harrison |
| 2008/0163633 A1 | 7/2008 | Magri et al. |
| 2008/0290844 A1 | 11/2008 | Borghi |
| 2010/0229578 A1 | 9/2010 | Borghi |
| 2011/0067425 A1 | 3/2011 | Taylor et al. |
| 2012/0013132 A1 | 1/2012 | LeBeau et al. |
| 2014/0230470 A1 | 8/2014 | Cook |
| 2016/0229362 A1 | 8/2016 | Brutus et al. |
| 2020/0324616 A1* | 10/2020 | Farhi .................... B60H 1/3222 |
| 2022/0305876 A1* | 9/2022 | Bidner ............... B60H 1/00914 |

* cited by examiner

*Primary Examiner* — Nelson J Nieves
(74) *Attorney, Agent, or Firm* — SNELL & WILMER L.L.P.

(57) ABSTRACT

A computerized vehicle controller and routing method for a vehicle that has at least one of a gasoline powered engine and an electric powered engine.

9 Claims, 21 Drawing Sheets

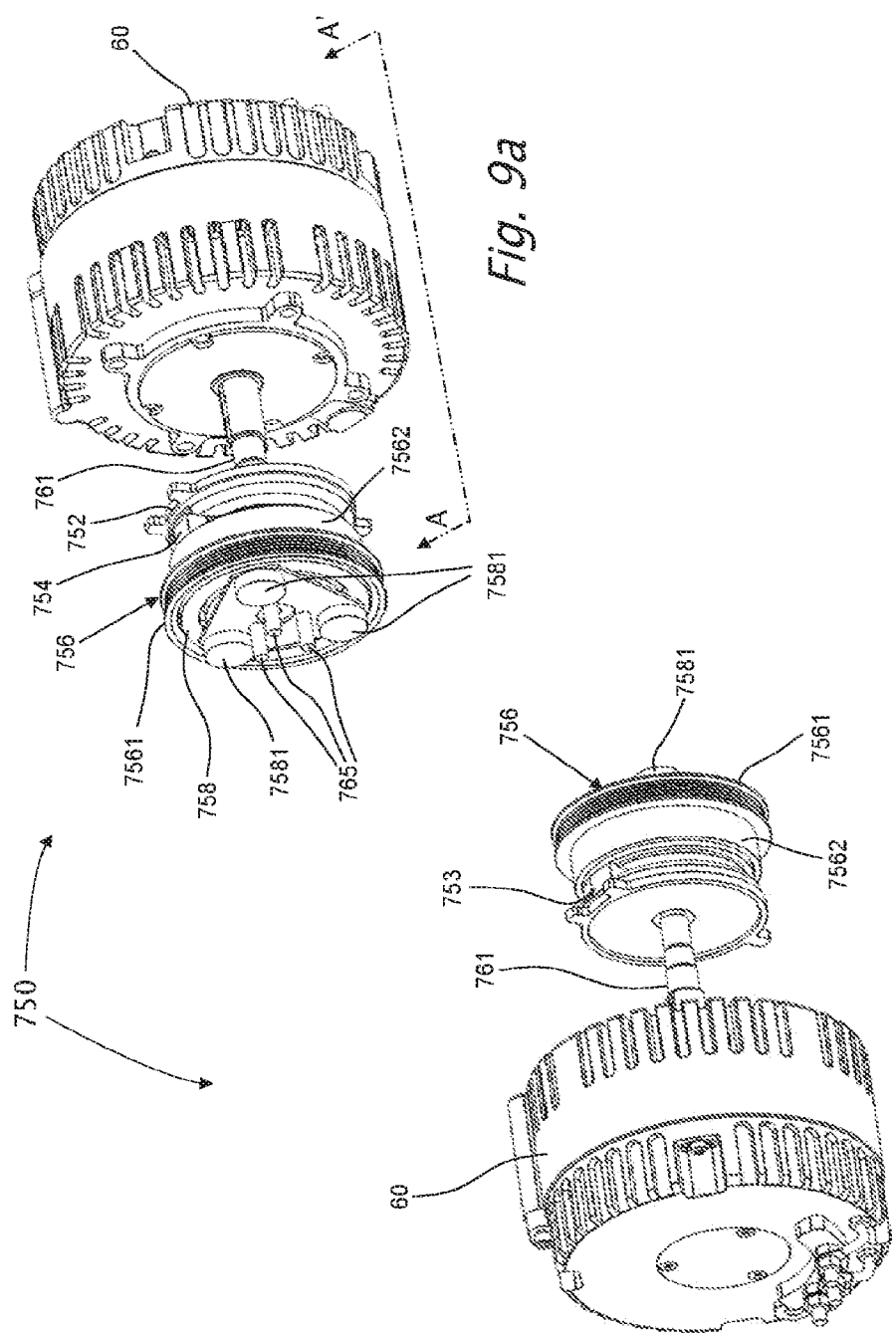

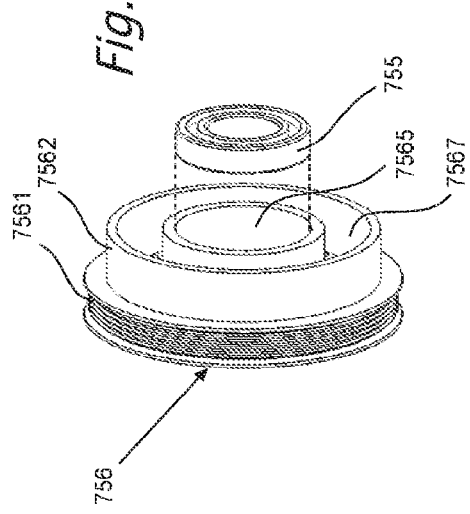
Fig. 12
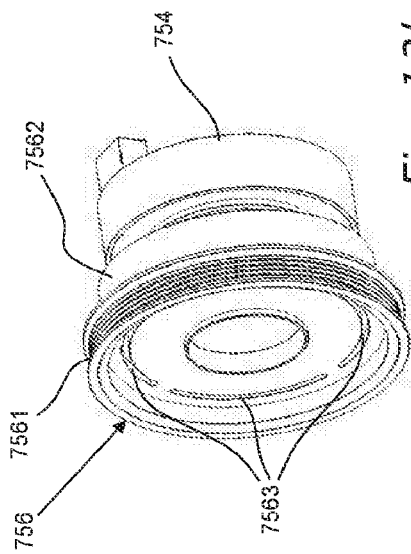
Fig. 13b
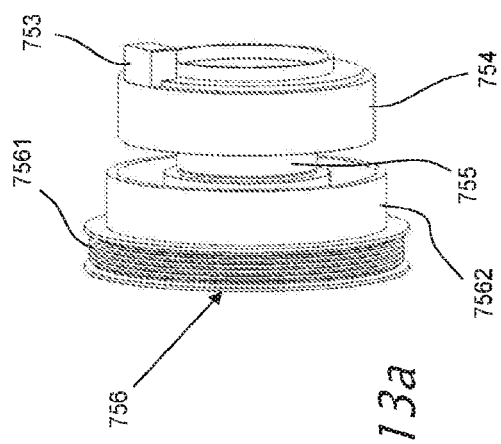
Fig. 13a
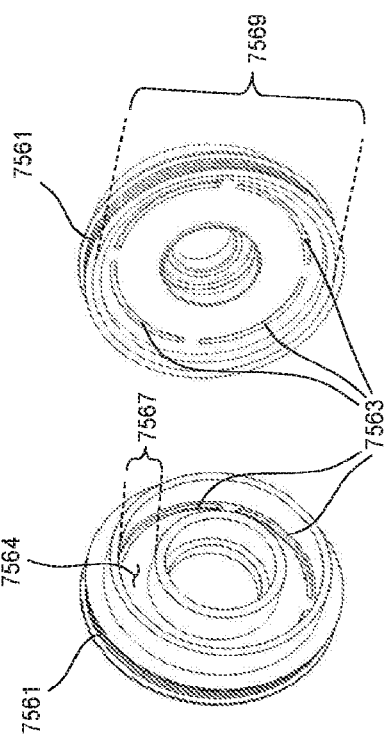
Fig. 13d
Fig. 13c

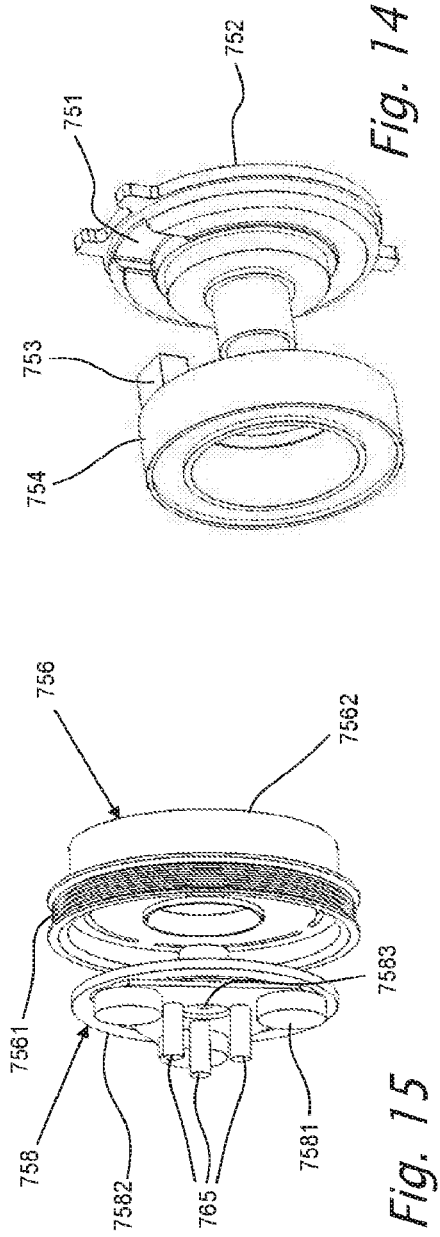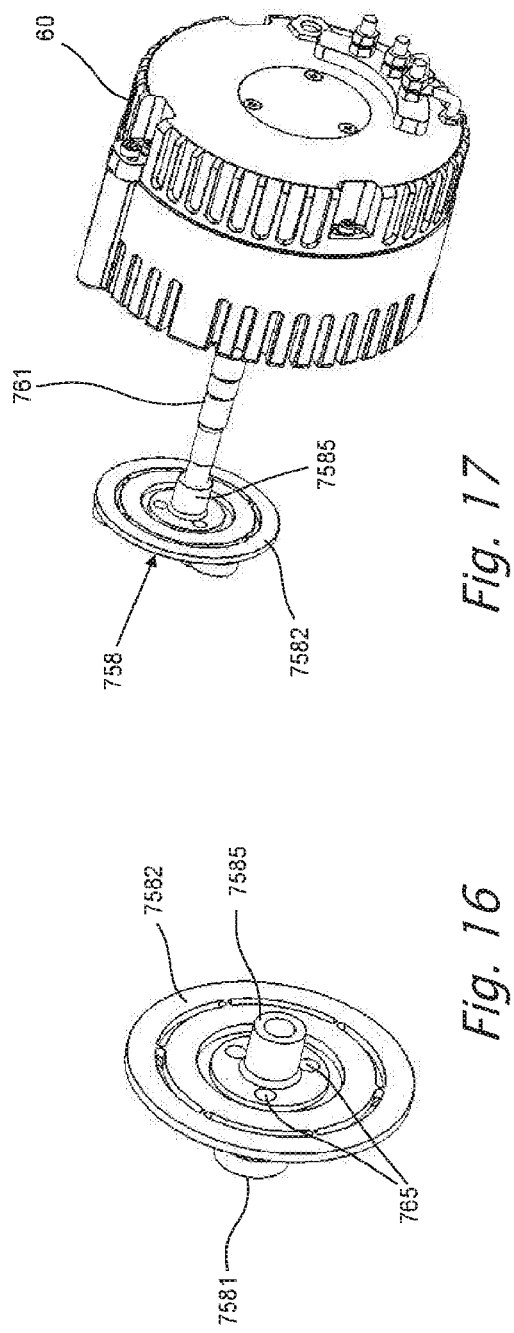

CROSS SECTION AA'

US 11,970,046 B1

COMPUTERIZED VEHICLE CONTROLLER AND ROUTING METHOD FOR A VEHICLE

FIELD OF THE INVENTION

The present invention relates to an auxiliary sub system for a vehicle, for providing air conditioning when the primary engine is turned OFF, and/or for providing electric power to various units of a vehicle, including charging the vehicle's battery, and including when the primary engine of the vehicle is turned OFF.

BACKGROUND OF THE INVENTION

It is often required to leave a vehicle parked for extended periods, wherein that might result in the temperature inside the passengers' cabin rising to become uncomfortably hot, and sometimes even dangerously hot, such as when a small child is left unattended inside the vehicle. Additionally, it is always desired in warm weather to keep the passengers' cabin comfortably cool.

There is therefore a need to provide a mean to controllably maintain the temperature inside the passengers' cabin within a comfort zone. In cases where a small child is left unattended inside a vehicle, it is desired to prolong the operation of the air-conditioning mean to for at least several hours.

U.S. Pat. No. 3,844,130, given to Wahnish, discloses an auxiliary air conditioner drive system adapted for use with an automobile having an air conditioning system normally driven by the drive means of the automobile includes means completely carried by the automobile and independent of the automobile drive means for driving the air conditioning system, and means for disengaging the air conditioning system from the automobile drive means and thereafter engaging the independent drive means thereto. The system involves a complicated clutching arrangement, among other disadvantages. In particular, the operation of such a system requires extensive power, which may rapidly drain the vehicle's battery.

U.S. Pat. No. 4,531,379, given to Diefenthaler, Jr., describes a system which uses a mechanical connection, via a "jack shaft" assembly, between an auxiliary engine and the air conditioner condenser, among other significant differences. It also requires a complex system, which requires extensive power, and which may rapidly drain the vehicle's battery.

There is therefore a need and it would be advantageous to have an auxiliary system for a vehicle that enables lowering the temperature inside the vehicle's cabin, when the primary engine of the vehicle is turned OFF. There is a further need to have an auxiliary system for a vehicle that enables recharging the vehicle's battery, when the primary engine of the vehicle is turned OFF.

SUMMARY OF THE INVENTION

The principle intentions of the present invention include providing an auxiliary system for a vehicle that enables lowering the temperature inside the vehicle's cabin, when the primary engine of the vehicle is turned OFF. The principle intentions of the present invention further include providing an auxiliary system for a vehicle that enables recharging the vehicle's battery, when the primary engine of the vehicle is turned OFF.

According to teachings of the present invention, there is provided an auxiliary system for a vehicle having a primary engine and an air conditioning system. The vehicle's air conditioning system includes:
  a. a mechanically driven air conditioning compressor;
  b. an alternator;
  c. a condenser that is operatively coupled with a fan that is operated by a fan-motor;
  d. a battery;
  e. an A/C unit; and
  f. a blower coupled to be operated by a blower-motor.
The auxiliary system includes:
  a. an auxiliary controller (110, 210a, 210b) that remains operable when the primary engine is turned OFF;
  b. a cabin-temperature sensor; and
  c. an auxiliary alternator-motor coupled to operate an auxiliary alternator, wherein the auxiliary electric alternator-motor is operable by the battery, and wherein said auxiliary alternator is configured to recharge the battery.

When the primary engine is a fuel powered engine, the auxiliary system further includes an auxiliary compressor coupled to be operated by a first-auxiliary-compressor-motor and a pair of electric relay switches (140). The electric relay switches include first electric relay switch (140a) and a second electric relay switch (140b), wherein the first electric relay switch is configured to route compressed gas vapor either from the vehicle's air conditioning compressor or from the auxiliary compressor towards the A/C unit, and the second electric relay switch is configured to route returning gas vapor from the vehicle's A/C unit, either towards the vehicle's air conditioning compressor or towards the auxiliary compressor.

Upon turning OFF the fuel powered primary engine, the auxiliary controller is configured to start monitoring the ambient temperature inside the passengers' cabin of the vehicle, utilizing the cabin-temperature sensor, wherein the fan-motor, the blower-motor, the auxiliary electric alternator-motor and the first-auxiliary-compressor-motor are in operational communication flow with the auxiliary controller' (110). Upon determining that the ambient temperature inside the cabin is above a preconfigured threshold temperature, the auxiliary controller (110) is configured to activate the auxiliary electric alternator-motor, the blower, the fan, the electric relay switches and the auxiliary compressor. The electric alternator-motor activates the auxiliary alternator. The electric relay switches route compressed gas vapor from the auxiliary compressor towards the A/C unit, and route returning gas vapor from the A/C unit towards the auxiliary compressor.

When the primary engine is an electric powered engine, or the vehicle is operated by a dual-engines configuration, then upon turning OFF the primary engine, the auxiliary system further includes a second-auxiliary-compressor-motor configured to operate the vehicle's air conditioning compressor. Upon determining that the ambient temperature inside the cabin is above a preconfigured threshold temperature, the auxiliary controller (210a, 210b) is configured to activate the auxiliary electric alternator-motor that activates the auxiliary alternator, the blower, the fan and the second-auxiliary-compressor-motor, to thereby activate the vehicle's air conditioning compressor and thereby activated the vehicle's air conditioning system.

When the primary engine is a fuel powered engine and the primary engine is powered OFF, upon determining that the ambient temperature inside the cabin is not above the preconfigured threshold temperature the auxiliary controller deactivates the auxiliary compressor.

When the primary engine is an electric powered engine, or the vehicle is operated by a dual-engines configuration, and the primary engine is powered OFF, upon determining that the ambient temperature inside the cabin is not above the preconfigured threshold temperature, the auxiliary controller (210a, 210b) deactivates the second-auxiliary-compressor-motor to thereby deactivate the vehicle's air conditioning compressor.

Optionally, the second-auxiliary-compressor-motor activates the air vehicle's conditioning compressor using an electromagnetic clutch.

According to further teachings of the present invention, there is provided a vehicle air conditioning method for air conditioning the passengers' cabin of the vehicle when the primary engine is not operating, the method including the steps of:

a. providing an auxiliary system as described hereabove;
b. continuously monitoring the temperature in the cabin of the passengers' vehicle by the auxiliary controller, using the cabin-temperature sensor,
c. determining that the ambient temperature inside the cabin is above a preconfigured threshold temperature; and
d. upon determining that the ambient temperature inside the cabin is above the preconfigured threshold temperature,
  i. if the primary engine is a fuel powered engine, activating the auxiliary alternator, the blower, the fan, the electric relay switches and the auxiliary compressor, to thereby route compressed gas vapor from the auxiliary compressor towards the A/C unit, and route returning gas vapor from the A/C unit towards the auxiliary compressor, and thereby drive down the temperature inside the cabin; and
  ii. if the primary engine is the primary engine is an electric powered engine or the vehicle is operated by a dual-engines configuration, activating the auxiliary alternator, the blower, the fan and the second-auxiliary-compressor-motor, to thereby activate the vehicle's air conditioning compressor and thereby activated the vehicle's air conditioning system, to thereby drive down the temperature inside the cabin.

Optionally, the method further includes the of the step of continuously monitoring the temperature in the passengers' cabin of the vehicle and determining that the ambient temperature inside the cabin is not above a preconfigured threshold temperature, and
  i. if the primary engine is a fuel powered engine, deactivating the auxiliary compressor and then the electric relay switches, to thereby route compressed gas vapor from the vehicle's compressor towards the A/C unit, and route returning gas vapor from the A/C unit towards the vehicle's compressor; and
  ii. deactivating the auxiliary alternator, the blower and the fan.

Optionally, upon turning ON the vehicle's primary engine, the primary engine being a fuel only powered engine, the method further includes the step of deactivating the auxiliary compressor, the auxiliary alternator, the blower, the fan and the electric relay switches, to thereby route compressed gas vapor from the vehicle's compressor towards the A/C unit, and route returning gas vapor from the A/C unit towards the vehicle's compressor.

While monitoring the temperature inside the vehicle's passengers' cabin, Optionally, the method may further include the step of:

a. continuously monitoring the status of any one of the vehicle's side air-bags; and
b. upon determining that any one of the vehicle's side air-bags has been activated, activating the auxiliary system, as described hereabove.

According to further teachings of the present invention, there is provided a vehicle battery charging method, including the steps of:

a. providing an auxiliary system, as described hereabove;
b. continuously monitoring the battery charging level of the vehicle's battery by the auxiliary controller; and
c. upon determining that the battery charging level of the battery is not above a preconfigured charging threshold level, then:
  i. if the primary engine is turned OFF, activating the auxiliary alternator to join the vehicle's alternator in charging the battery, and
  ii. if the primary engine is turned ON, then:
    A. determining the charging amperage; and
    B. upon determining that the charging amperage is not above a preconfigured amperage threshold, activating the auxiliary alternator to join the vehicle's alternator in charging the battery.

According to further teachings of the present invention, there is provided an electricity-supply-interface apparatus (750) for a motor vehicle, including:

a. the vehicle's alternator;
b. an interface-shaft;
c. an electromagnet (754);
d. a rotor unit couple to rotate with a bearing unit;
e. a rotational-motion-receiving-unit having a mechanical adaptor (765) configured to receive rotational motion either from the vehicle's primary engine or from an alternative electric alternator-motor (760); and
f. a magnetic-insulator.

The rotational-motion-receiving-unit is securely attached to a first end of the interface-shaft, and the interface-shaft is further securely attached at a second end of the vehicle's alternator. Upon receiving the rotational motion, the rotational motion is transferred via securely attached interface-shaft to the vehicle's alternator, to thereby provide electric power to various units of the vehicle, including charging the vehicle's battery.

The vehicle's alternator may be replaced by an alternative alternator.

According to aspects of the present invention, there is provided an auxiliary system for a vehicle having a primary engine and an air conditioning system, the vehicle's air conditioning system including:

a. a mechanically driven air conditioning compressor;
b. an alternator;
c. a condenser that is operatively coupled with a fan that is operated by a fan-motor;
d. a battery;
e. an A/C unit; and
f. a blower coupled to be operated by a blower-motor.

The auxiliary system includes:

a. an auxiliary controller (110, 210a, 210b) that remains operable when the primary engine is turned OFF;
b. a cabin-temperature sensor; and
c. an alternative alternator-motor (760) coupled to operate an electricity-supply-interface apparatus (750), wherein upon the primary engine being turned ON, the rotational motion is received via a driving belt operationally connected to the primary engine and to rotational-motion-receiving-unit; and upon the primary engine being turned OFF, the rotational motion is received via a mechanical adaptor operationally connected to rotational-motion-receiving-unit.

When the primary engine is a fuel powered engine, the auxiliary system further includes an auxiliary compressor, coupled to be operated by a first-auxiliary-compressor-motor and a pair of electric relay switches (140). The electric relay switches include a first electric relay switch (140*a*) and a second electric relay switch (140*b*), wherein the first electric relay switch is configured to route compressed gas vapor either from the vehicle's air conditioning compressor or from the auxiliary compressor towards the A/C unit, and the second electric relay switch is configured to route returning gas vapor from the vehicle's A/C unit, either towards the vehicle's air conditioning compressor or towards the auxiliary compressor, Upon turning OFF the fuel powered primary engine, the auxiliary controller is configured to start monitoring the ambient temperature inside the passengers' cabin of the vehicle, utilizing the cabin-temperature sensor, wherein the fan-motor, the blower-motor, the auxiliary alternator-motor (760) and the first-auxiliary-compressor-motor are in operational communication flow with the auxiliary controller (110). Upon determining that the ambient temperature inside the cabin is above a preconfigured threshold temperature, the auxiliary controller (110) is configured to activate auxiliary alternator-motor (760), the blower, the fan, the electric relay switches, to thereby route compressed gas vapor from the auxiliary compressor towards the A/C unit, and route returning gas vapor from the A/C unit towards the auxiliary compressor, and to activate the auxiliary compressor.

When the primary engine is an electric powered engine, or the vehicle is operated by a dual-engines configuration, and wherein upon turning OFF the primary engine, the auxiliary system further includes a second-auxiliary-compressor-motor configured to operate the air conditioning compressor. Upon determining that the ambient temperature inside the cabin is above a preconfigured threshold temperature, the auxiliary controller (210*a*, 210*b*) is configured to activate the auxiliary alternator-motor, the blower, the fan and the second-auxiliary-compressor-motor, to thereby activate the air conditioning compressor and thereby activated the vehicle's air conditioning system.

When the primary engine is a fuel powered engine and the primary engine is powered OFF, upon determining that the ambient temperature inside the cabin is not above the preconfigured threshold temperature the auxiliary controller deactivates the auxiliary compressor.

When the primary engine is an electric powered engine, or the vehicle is operated by a dual-engines configuration, and the primary engine is powered OFF, upon determining that the ambient temperature inside the cabin is not above the preconfigured threshold temperature the auxiliary controller (210*a*, 210*b*) deactivates the second-auxiliary-compressor-motor to thereby deactivate the air conditioning compressor.

Optionally, the second-auxiliary-compressor-motor activates the air vehicle's conditioning compressor using an electromagnetic clutch.

Optionally, the auxiliary controller is further configured to monitor the battery charging level of the battery.

When the primary engine of the vehicle is turned ON, upon determining that the battery charging level of the battery is not above a preconfigured threshold level and that the charging amperage is not above a preconfigured amperage threshold, the auxiliary controller is configured to activate the auxiliary alternator to thereby charge the battery.

When the primary engine of the vehicle is turned OFF, upon determining that battery charging level of the battery is not above a preconfigured charging threshold level, the auxiliary controller is configured to activate the auxiliary alternator to thereby charge the battery.

In some embodiments, the auxiliary controller is further configured to check if any of the vehicle's side airbags has been activated, wherein upon determining that a side airbag has been activated, the auxiliary controller is configured to activate the auxiliary alternator, the blower, the fan, the electric relay switches, to thereby route compressed gas vapor from the auxiliary compressor towards the A/C unit, and route returning gas vapor from the A/C unit towards the auxiliary compressor, and to activate the auxiliary compressor.

In some embodiments, the vehicle further includes an A/C system, wherein upon determining that the ambient temperature inside the cabin is above a preconfigured threshold temperature, the auxiliary controller (710, 810*a*, 810*b*) is configured to activate the alternative alternator-motor (760) and the vehicle's alternator (60), and the vehicle's A/C system.

In some embodiments, the auxiliary controller (710, 810*a*, 810*b*) is further configured to check if any of the vehicle's front airbags has been activated, wherein upon determining that a front airbag has been activated, the auxiliary controller is configured to turn OFF the primary engine and deactivate the vehicles alternator. Upon determining that a front airbag has been activated, the auxiliary controller is further configured to disconnect the vehicle's battery.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 9a illustrates a front perspective view of an assembled example of an electricity-supply-interface apparatus, interfaced with the vehicle's alternator, according to embodiments of the present invention.

FIG. 9b is a rear perspective view illustration of the assembled example of the electricity-supply-interface apparatus shown in FIG. 9a, interfaced with the vehicle's alternator.

FIG. 12 is an exploded side perspective view illustration of the rotor unit, showing a bearing unit being securely fitted in a bore at the center of the rotor unit, according to embodiments of the present invention.

FIGS. 13a-13b are exploded side perspective view illustrations of the rotor unit, showing a bearing unit being securely fitted in a bore at the center of the rotor unit, according to embodiments of the present invention.

FIG. 13c is a rear perspective view illustration of the rotor unit.

FIG. 13d is a front perspective view illustration of the rotor unit.

FIG. 14 is a front exploded perspective view illustration of the electromagnet, and the magnetic-insulator, according to embodiments of the present invention.

FIG. 15 is a front exploded perspective view illustration of the rotor unit and the rotational-motion-receiving-unit, according to embodiments of the present invention.

FIG. 16 is a rear perspective view illustration of the rotational-motion-receiving-unit, according to embodiments of the present invention.

FIG. 17 is a rear perspective view illustration of the rotational-motion-receiving-unit being securely attached to a first (front) end of the interface-shaft via a shaft-attachment-member, and the vehicle's alternator being securely attached to the second (rear) end of interface-shaft via the shaft-attachment-member, according to embodiments of the present invention.

DETAILED DESCRIPTION OF THE INVENTION

The present invention will now be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily in all embodiments, of the inventions. It is understood that the phraseology and terminology employed herein are not to be construed as limiting and are for descriptive purposes only.

Methods of the present invention may be implemented by performing or completing manually, automatically, or a combination thereof, selected steps or tasks. The order of performing some method steps may vary. The descriptions, examples, methods and materials presented in the claims and the specification are not to be construed as limiting but rather as illustrative only.

Meanings of technical and scientific terms used herein are to be commonly understood, unless otherwise defined. The present invention can be implemented for testing or practice with methods and materials equivalent or similar to those described herein.

It should be noted that orientation related descriptions such as "front", "rear", "bottom", "up", "upper". "down", "lower", "top" and the like, assumes that the associated item is operationally situated within a vehicle situated on a ground surface.

Throughout this document, numerous textual and graphical references are made to trademarks, and domain names. These trademarks and domain names are the property of their respective owners, and are referenced only for explanation purposes herein.

Figure 1:
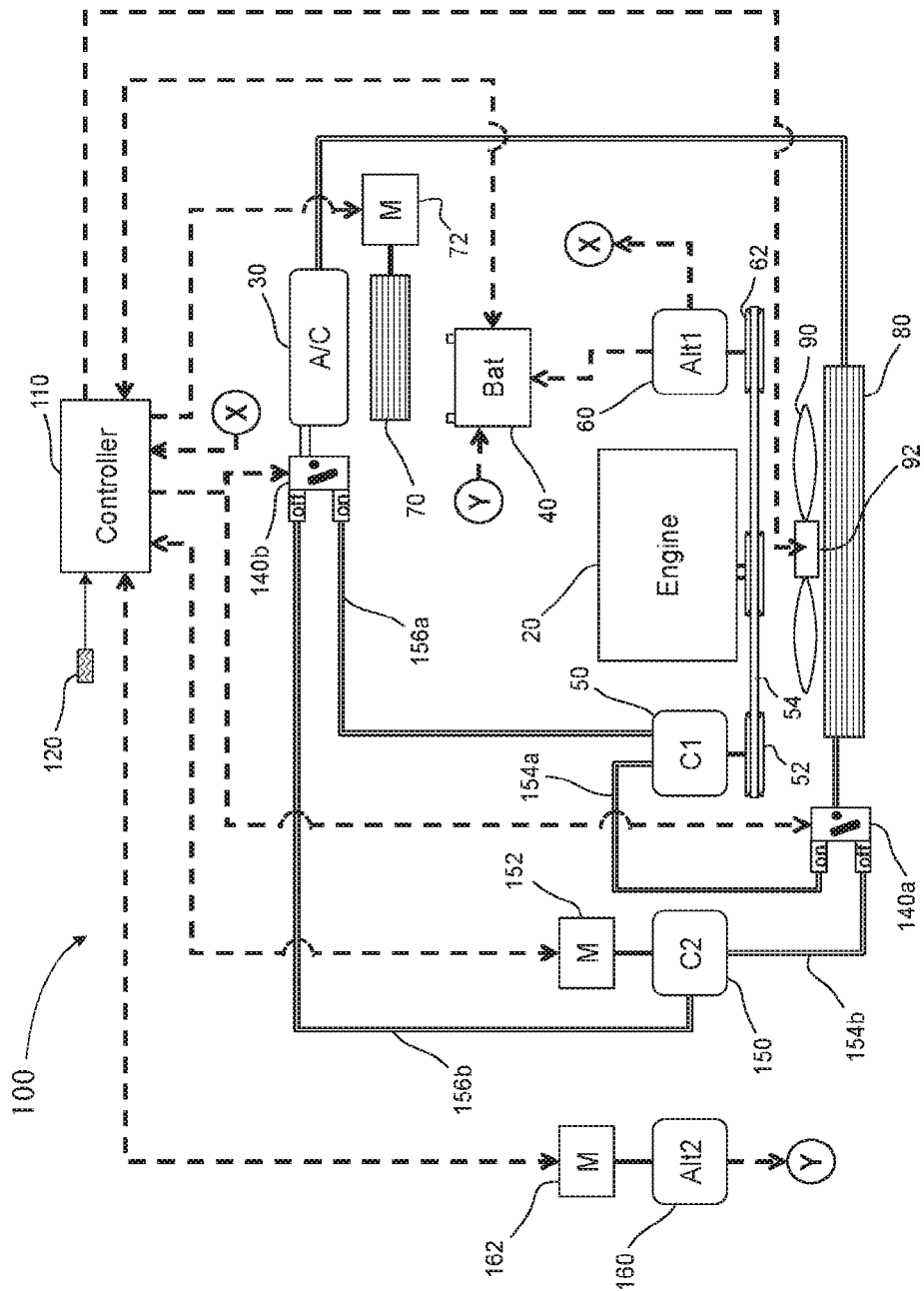
FIG. 1 is a general schematic block diagram illustration of the components of an auxiliary battery charging and vehicle air conditioning system, wherein the vehicle's primary engine is a fuel powered engine, the system including an auxiliary air-conditioning sub-system, according to some embodiments of the present invention.

Reference is now made to the drawings. FIG. 1 is a schematic block diagram illustration of the components of an auxiliary vehicle air conditioning system 100, according to embodiments of the present invention, including an auxiliary air-conditioning sub-system. Auxiliary air conditioning system 100 includes an auxiliary controller 110, a cabin-temperature sensor 120, the vehicle's air-condition (A/C) unit 30 having a thermal expansion valve, a pair of electric relay switches 140, the vehicle's compressor 50, an auxiliary compressor 150 coupled to be operated by a motor 152, the vehicle's alternator 60, an auxiliary alternator 160 coupled to be operated by an electric alternator-motor 162, which alternator-motor 162 is operable by the vehicle's battery 40. Auxiliary controller 110 remains operable when the primary engine is turned OFF.

Typically, the vehicle air-condition system utilizes gas vapor that flows in a closed loop. The pair of electric relay switches 140, which work in parallel, are set to allow either the vehicle's compressor 50 or the auxiliary compressor 150 to compress the gas vapor refrigerant in a closed loop. In normal operation, when the vehicle's air conditioning system operates in order, the pair of electric relay switches 140 are set to allow the vehicle's compressor 50 to flow the compressed gas vapor flow towards a condenser 80 via a first forwarding pipe 154a, and to allow returning gas vapor to flow from A/C unit 30 back to the vehicle's compressor 50 via a first returning pipe 156a. Similarly, when the auxiliary air conditioning system is operated, the pair of electric relay switches 140 are set to allow the auxiliary compressor 150 to flow the compressed gas vapor flow towards condenser 80 via a second forwarding pipe 154b, and to allow returning gas vapor to flow from A/C unit 30 back to the auxiliary compressor 150 via a second returning pipe 156b.

In normal operation, when the vehicle's air conditioning system is in order, the pair of electric relay switches 140, which work in parallel, are set to allow the vehicle's compressor 50, which is activated by the vehicle's primary engine 20 via a pulley 52 and a belt 54, to make the compressed gas vapor flow through the vehicle's condenser 80, which is typically cooled by the vehicle's fan 90, to thereby condense the vapor into a liquid. The condensed and pressurized liquid refrigerant is then through a thermal expansion valve in the vehicle's A/C unit 30, where the liquid refrigerant undergoes an abrupt reduction in pressure. That abrupt pressure reduction results in flash evaporation of a part of the liquid refrigerant, lowering its temperature. The cold refrigerant is then typically routed through an evaporator coil. Typically, air is then blown by the vehicle's blower 70 across the evaporator, causing the liquid part of the cold refrigerant mixture to evaporate as well, further lowering the temperature. The blown warm air is therefore cooled down and in the process, also deprived of any humidity.

Auxiliary air conditioning system 100 is designed to cool down the passengers' cabin, when the vehicle's primary engine 20 is turned OFF. Controller 110 monitors the ambient temperature inside the cabin is utilizing cabin-temperature sensor 120. Upon detecting that the ambient temperature inside the cabin is above a preconfigured threshold temperature, controller 110 activates the auxiliary air conditioning system 100 to drive the temperature inside the cabin bellow the preconfigured threshold temperature.

When the vehicle's primary engine 20 is turned OFF, controller 110 monitors the ambient temperature inside the cabin is utilizing cabin-temperature sensor 120. Upon detecting that the ambient temperature inside the cabin is above a preconfigured threshold temperature, controller 110 activates the pair of electric relay switches 140, both in parallel, such as to disengage vehicle compressor 50, and engage the auxiliary air-conditioning sub-system. When the auxiliary air conditioning system is operatively engaged, the pair of electric relay switches 140 are set to allow auxiliary compressor 150 to flow the compressed gas vapor flow towards condenser 80 via a second forwarding pipe 154b, and to allow returning gas vapor to flow from A/C unit 30 back to the auxiliary compressor 150 via a second returning pipe 156b.

Preferably, motor 152 that is coupled to be operated auxiliary compressor 150, is a stepper electric motor. By using a stepper electric motor, when disengaging either the vehicle compressor 50 or the auxiliary compressor 150, no return pressure is built in the pipes channeling the pressurized gas vapor.

Figure 2A:
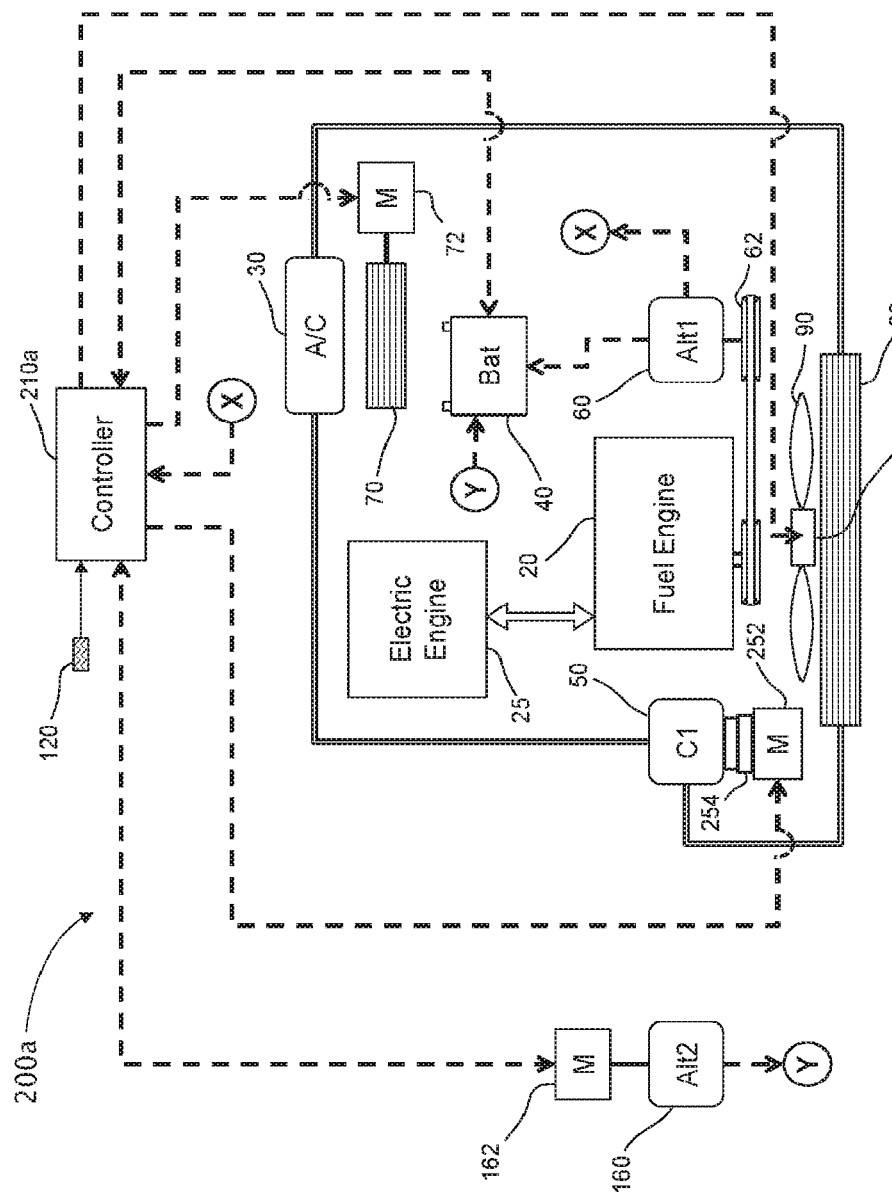
FIG. 2*a* is a general schematic block diagram illustration of the components of an auxiliary battery charging and vehicle air conditioning system, wherein the vehicle's primary engine is a hybrid powered engine, according to some embodiments of the present invention.

Reference is now also made to FIG. 2a, showing a general schematic block diagram illustration of the components of an auxiliary vehicle air conditioning system 200a, wherein the vehicle's primary engine is hybrid powered engine, according to some embodiments of the present invention. The hybrid engine has a dual-engines configuration, including a fuel engine 20 and an electric engine 25.

Figure 2B:
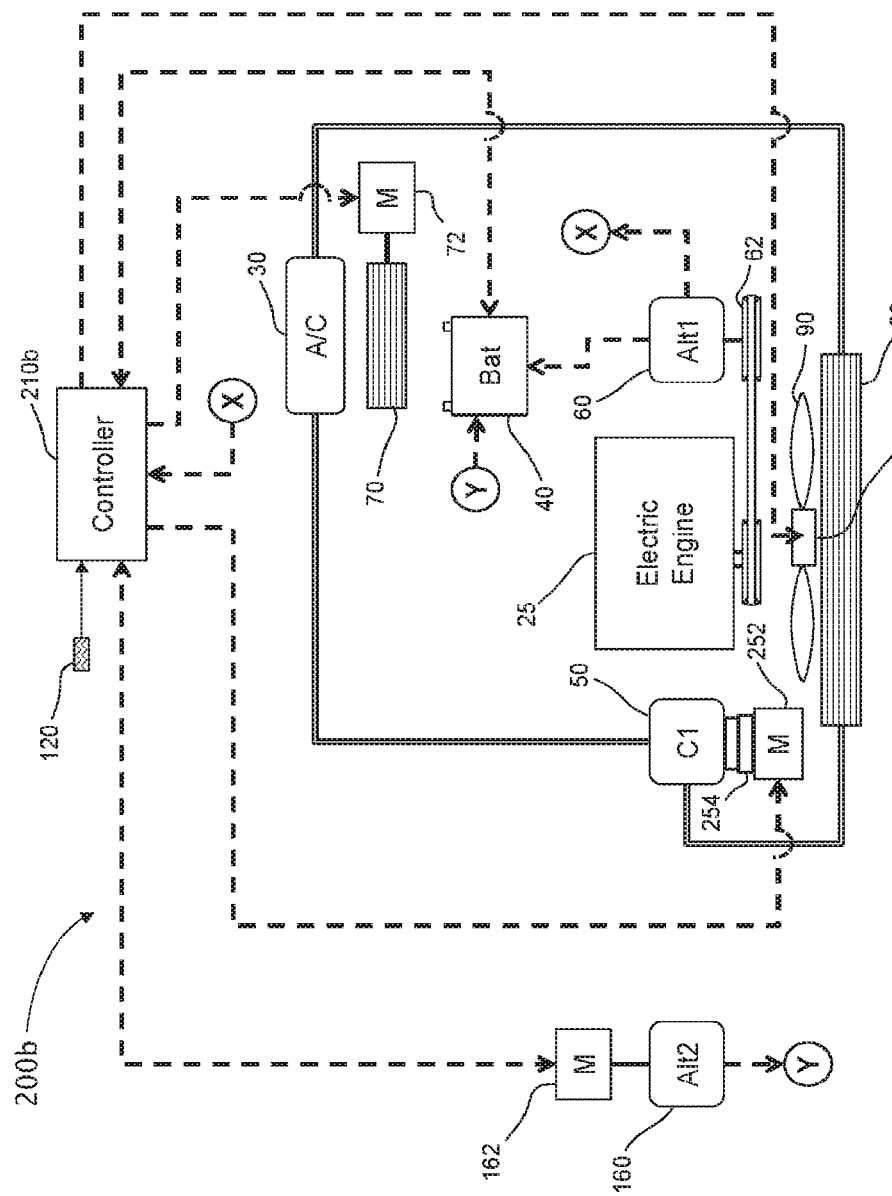
FIG. 2*b* is a general schematic block diagram illustration of the components of an auxiliary battery charging and vehicle air conditioning system, wherein the vehicle's primary engine is an electric powered engine, according to some embodiments of the present invention.

FIG. 2b is a general schematic block diagram illustration of the components of an auxiliary vehicle air conditioning system 200b, wherein the vehicle's primary engine is an electric powered engine 25, according to some embodiments of the present invention.

Both air conditioning systems 200a and 200b, wherein include an auxiliary controller 210 (210a and 210b), a cabin-temperature sensor 120, the vehicle's air-condition (A/C) unit 30 having a thermal expansion valve, the vehicle's compressor 50, the vehicle's alternator 60, a second-auxiliary-compressor-motor 252 configured to operate the air conditioning compressor 50, an auxiliary alternator 160 coupled to be operated by an electric alternator-motor 162, which electric alternator-motor 162 is operable by the vehicle's battery 40. Auxiliary controller 210 remains operable when the primary engine is turned OFF.

Typically, the vehicle's air-condition system utilizes gas vapor that flows in a closed loop, wherein compressor 50 is configured to compress the gas vapor refrigerant and wherein the second-auxiliary-compressor-motor 252 configured to operate the air conditioning compressor 50. When the vehicle's primary engine (20, 25) operates and the vehicle's air conditioning system is turned OFF, controller 210 is configured to detach second-auxiliary-compressor-motor 252 from air conditioning compressor 50. In some embodiments, the second-auxiliary-compressor-motor 252 is operatively engaged with air conditioning compressor 50, for example, by an electromagnetic clutch 254. When the vehicle's air conditioning system is turned ON, second-auxiliary-compressor-motor 252 is activated to thereby operate air conditioning compressor 50 by transmitting mechanically torque thereto. From the vehicle's compressor 50 the compressed gas vapor flow towards condenser 80, wherein the condensed and pressurized liquid refrigerant is then through a thermal expansion valve in the vehicle's A/C unit 30, where the liquid refrigerant undergoes an abrupt reduction in pressure. The abrupt pressure reduction results in flash evaporation of a part of the liquid refrigerant, lowering its temperature. The cold refrigerant is then typically routed through an evaporator coil. Typically, air is then blown by the vehicle's blower 70 across the evaporator, causing the liquid part of the cold refrigerant mixture to evaporate as well, further lowering the temperature. The blown warm air is therefore cooled down and in the process, also deprived of any humidity.

Auxiliary air conditioning system 100 is designed to cool down the passengers' cabin, when the vehicle's primary engine 20 is turned OFF. Controller 110 monitors the ambient temperature inside the cabin is utilizing cabin-temperature sensor 120. Upon detecting that the ambient temperature inside the cabin is above a preconfigured threshold temperature, controller 110 activates the auxiliary air conditioning system 100 to drive the temperature inside the cabin bellow the preconfigured threshold temperature.

When the vehicle's primary engine 20 is turned OFF, contoller 210 monitors the ambient temperature inside the cabin is utilizing cabin-temperature sensor 120. Upon detecting that the ambient temperature inside the cabin is above a preconfigured threshold temperature, controller 210 activates second-auxiliary-compressor-motor 252 to thereby operate air conditioning compressor 50 by transmitting mechanically torque thereto.

Figure 3:
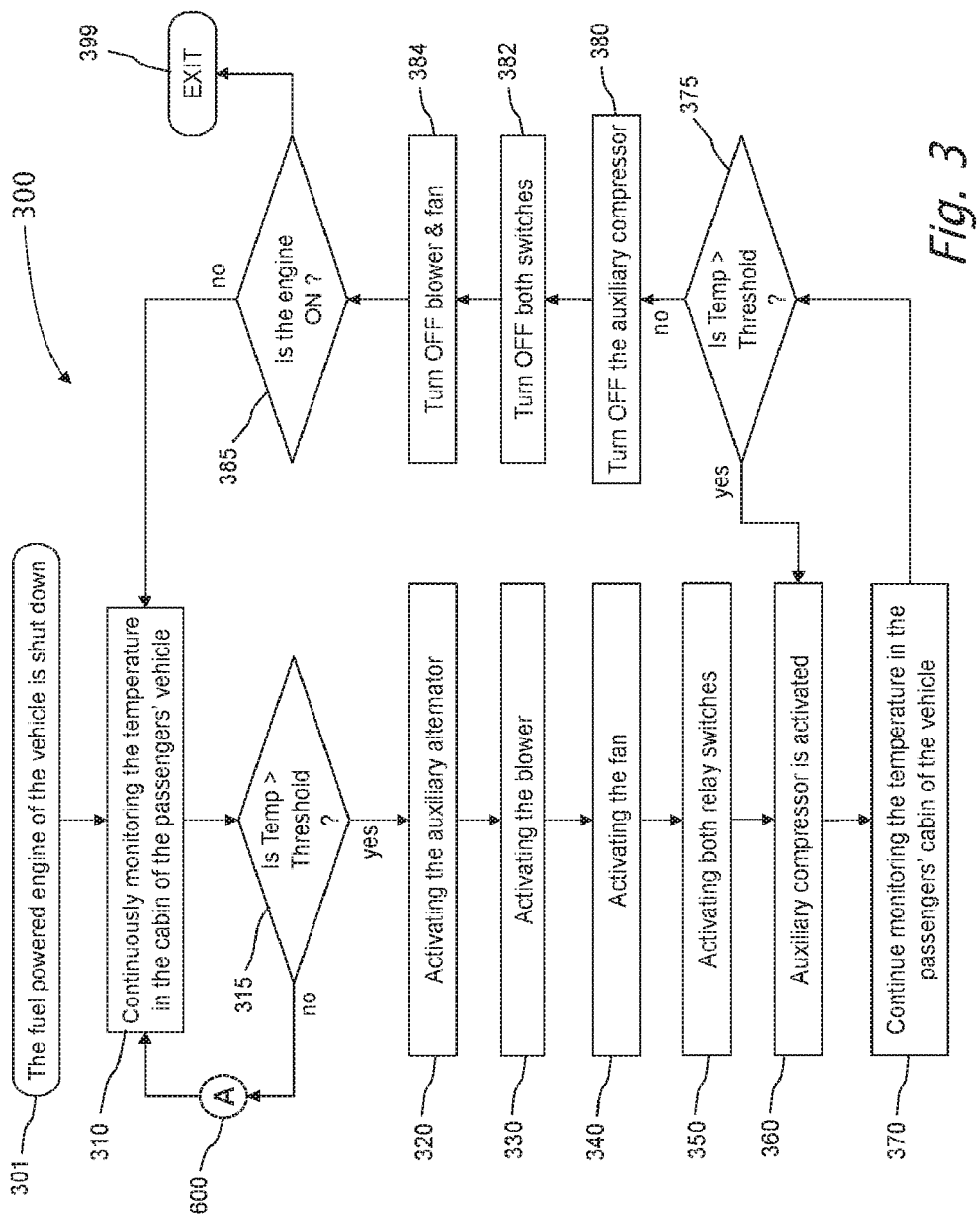
FIG. 3 shows a schematic flowchart diagram of a vehicle air conditioning method, according to some embodiments of the present invention, wherein the method is operable when the vehicle's fuel primary engine is not operating.

Reference is now also made to FIG. 3, showing a schematic flowchart diagram of a vehicle air conditioning method 300, according to some embodiments of the present invention, wherein method 300 is operable when the vehicle's primary engine is a fuel powered engine and is not operating. Upon turning off the vehicle's primary engine 20 (Step 301), air conditioning method 300 proceeds as follows:

Step 310: continuously monitoring the temperature in the cabin of the vehicle.
    Controller 110 continuously monitors the temperature inside the cabin of the vehicle, using cabin-temperature sensor 120.

Step 315: checking if the ambient temperature inside the cabin is above a preconfigured threshold temperature.
    Controller 110 continuously checks if the ambient temperature inside the cabin is above a preconfigured threshold temperature.
    If the ambient temperature inside the cabin is not above the preconfigured threshold temperature, then:
        optionally, perform accident air conditioning method 600.
        go back to Step 310.

Step 320: activating an auxiliary alternator.
    Controller 110 has determined that the ambient temperature inside the cabin is above the preconfigured threshold temperature.
    Controller 110 activates auxiliary alternator 160 by activating the operatively coupled electric alternator-motor 162, wherein auxiliary alternator 160 is configured to supply electricity to required, electrically operated vehicle units.

Step 330: activating the blower.
    Controller 110 activates a blower 70 by activating the operatively coupled motor 72, for blowing air across the evaporator and the cooled air into the passengers' cabin.

Step 340: activating the vehicle's fan.
    Controller 110 activates vehicle's fan 90 by activating the operatively coupled motor 92.

Step 350: activating both relay switches.
    Controller 110 activates both electric relay switches 140. Thereby, disengage the vehicle compressor 50 and engage the auxiliary air-conditioning sub-system.

Step 360: activating the auxiliary compressor.
    Controller 110 activates auxiliary compressor 150 by activating the operatively coupled motor 152 that will now circulate the gas vapor. Auxiliary compressor 150 substitutes the inactive vehicle compressor 50.
    The air condition is now operating, wherein the auxiliary compressor 150 compresses gas vapor to, typically, flow through condenser 80 to thereby condense the vapor into a liquid. The condensed and pressurized liquid refrigerant is then through a thermal expansion valve in the vehicle's A/C unit 30, where the liquid refrigerant undergoes an abrupt reduction in pressure. That pressure reduction results in flash evaporation of a part of the liquid refrigerant, lowering its temperature. The cold refrigerant is then routed through the evaporator coil into the passengers' cabin. Typically, the air is then blown by blower 70 across the evaporator, causing the liquid part of the cold refrigerant mixture to evaporate as well, further lowering the temperature. The warm air is therefore cooled and, in the process, also deprived of any humidity.
    Furthermore, auxiliary alternator 160 supplies electricity to all required units, including charging the vehicle's battery 40.

Step 370: continuously monitoring the temperature in the cabin of the vehicle.
    Controller 110 continuously monitors the temperature in the cabin of the vehicle, using cabin-temperature sensor 120.

Step 375: checking if the ambient temperature inside the cabin is above a preconfigured threshold temperature.
    Controller 110 continuously checks if the ambient temperature inside the cabin is still above a preconfigured threshold temperature.
    If the ambient temperature inside the cabin is still above the preconfigured threshold temperature, go back to Step 370.

Step 380: turn OFF the auxiliary compressor.
    Controller 110 turns OFF auxiliary compressor 154).

Step 382: turn OFF both switches.
    Controller 110 turns OFF both switches 140.

Step 384: turn OFF the blower and the fan.
    Controller 110 turns OFF blower 70 and fan 90.

Step 385: checking if the vehicle's primary engine is ON.
    Controller 110 checks if the vehicle's primary engine 20 has been turned ON.
    If the vehicle's primary engine 20 is turned ON, go to Step 399.
    Go to Step 310.

Step 399: exit.
(end of air conditioning method 300)

Figure 4:
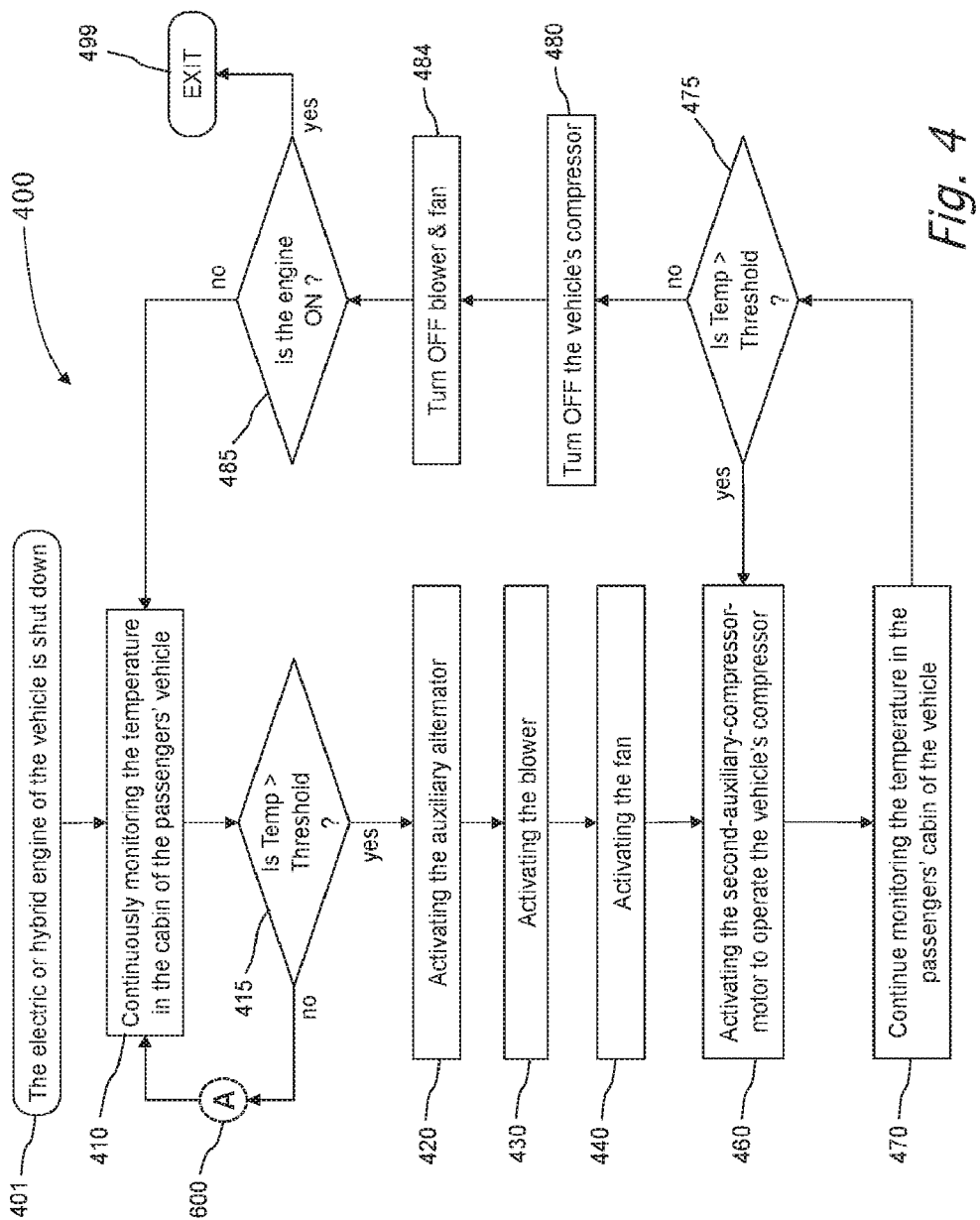
FIG. 4 shows a schematic flowchart diagram of a vehicle air conditioning, according to embodiments of the present invention, wherein the method is operable when the vehicle's hybrid or electrical primary engine is not operating.

Reference is now also made to FIG. 4, showing a schematic flowchart diagram of a vehicle air conditioning method 400, according to some embodiments of the present invention, wherein method 400 is operable when the vehicle's primary engine is an electric powered engine or a hybrid dual engine (fuel and electric) and is not operating. Upon turning off the vehicle's primary engine (25 or 20&25) (Step 401), air conditioning method 400 proceeds as follows:

Step 410: continuously monitoring the temperature in the cabin of the vehicle.

Controller 210 continuously monitors the temperature inside the cabin of the vehicle, using cabin-temperature sensor 120.

Step 415: checking if the ambient temperature inside the cabin is above a preconfigured threshold temperature.

Controller 210 continuously checks if the ambient temperature inside the cabin is above a preconfigured threshold temperature.

If the ambient temperature inside the cabin is not above the preconfigured threshold temperature, then:

optionally, perform accident air conditioning method 600; and go back to Step 410.

Step 420: activating an auxiliary alternator.

Controller 210 has determined that the ambient temperature inside the cabin is above the preconfigured threshold temperature.

Controller 210 activates auxiliary alternator 160 by activating the operatively coupled electric alternator-motor 162, wherein auxiliary alternator 160 is configured to supply electricity to required, electrically operated vehicle units.

Step 430: activating the blower.

Controller 210 activating a blower 70 by activating the operatively coupled motor 72, respectively, for blowing air across the evaporator and the cooled air into the passengers' cabin.

Step 440: activating the vehicle's fan.

Controller 210 activating vehicle's fan 90 by activating the operatively coupled motor 92.

Step 460: activating the compressor.

Controller 210 activates the vehicle's compressor 50 by activating second-auxiliary-compressor-motor 252 that operatively transmits mechanically torque to compressor 50.

Furthermore, auxiliary alternator 160 supplies electricity to all required units, including charging the vehicle's battery 40.

Step 470: continuously monitoring the temperature in the cabin of the vehicle.

Controller 110 continuously monitors the temperature in the cabin of the vehicle, using cabin-temperature sensor 120.

Step 475: checking if the ambient temperature inside the cabin is above a preconfigured threshold temperature.

Controller 110 continuously checks if the ambient temperature inside the cabin is still above a preconfigured threshold temperature.

If the ambient temperature inside the cabin is still above the preconfigured threshold temperature, go back to Step 470.

Step 480: optionally, turn OFF the compressor.

Controller 210 may turn OFF compressor 50 by activating second-auxiliary-compressor-motor 252.

Step 484: turn OFF the blower and the fan.

Controller 110 turns OFF blower 70 and fan 90.

Step 485: checking if the vehicle's primary engine is ON.

Controller 110 checks if the vehicle's primary engine has been turned ON.

If the vehicle's primary engine is turned ON, go to Step 499.

Go to Step 410.

Step 499: exit.

(end of air conditioning method 400)

Auxiliary battery charging and air conditioning system 100 is further designed to charge the vehicle's battery 40 upon determining that the battery 40 is bellow a preconfigured threshold level. This task may be performed regardless of the vehicle's primary engine 20 being ON or OFF.

Figure 5:
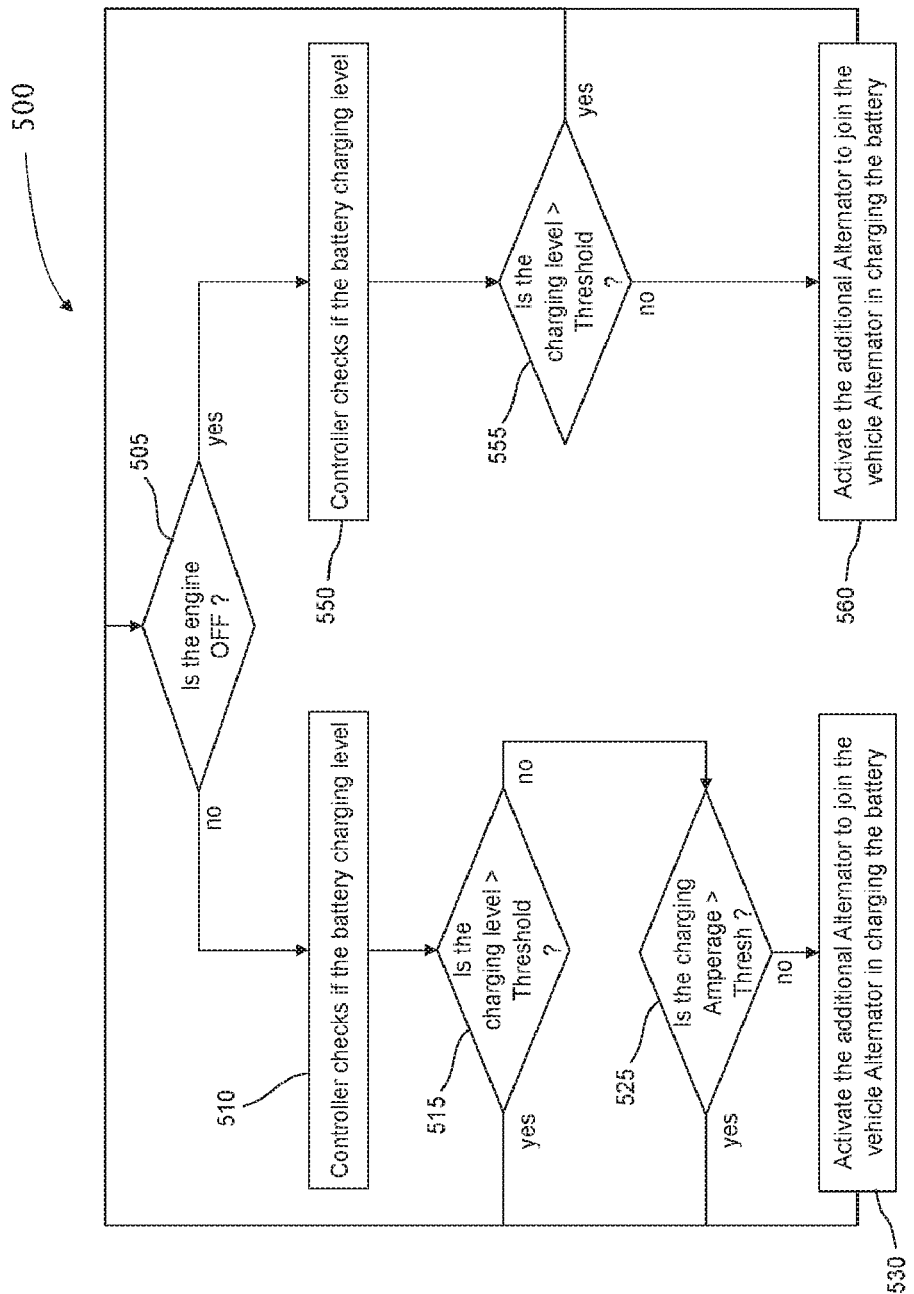
FIG. 5 shows a schematic flowchart diagram of a battery charging method for a vehicle during an accident situation, according to embodiments of the present invention.

Reference is now also made to FIG. 5, showing a schematic flowchart diagram of a vehicle battery charging method 500, according to some embodiments of the present invention, wherein method 500 is operable regardless of the vehicle's primary engine 20 being ON or OFF. Vehicle battery charging method 500 proceeds as follows:

Step 505: checking if the vehicle's primary engine is ON or OFF.

Controller 110 checks if the vehicle's primary engine 20 is turned ON or OFF.

If the vehicle's primary engine 20 is turned ON, go to Step 550.

Step 510: continuously monitoring the battery charging level.

Controller 110 has determined that the vehicle's primary engine 20 is turned ON.

Controller 110 continuously checks if the battery charging level of battery 40.

Step 515: checking if the battery charging level of the battery is bellow a preconfigured threshold level.

Controller 110 checks if the battery charging level of battery 40 is bellow a preconfigured threshold level.

If the battery charging level of the battery is above a preconfigured threshold level, go to Step 505.

Step 525: checking if the vehicle's primary engine is ON or OFF.

Controller 110 has determined that the battery charging level of the battery is not above a preconfigured threshold level.

Controller 110 checks if the charging amperage is above a preconfigured amperage threshold.

If the charging amperage is above a preconfigured amperage threshold, go to Step 505.

Step 530: activating the auxiliary alternator.

Controller 110 has determined that the battery charging level of the battery is not above a preconfigured threshold level, and that the charging amperage is not above a preconfigured amperage threshold.

Controller 110 activates the auxiliary alternator 160 to join the vehicle's alternator 60 in charging the vehicle's battery 40.

Step 550: continuously monitoring the battery charging level.

Controller 110 has determined that the vehicle's primary engine 20 is turned OFF.

Controller 110 continuously checks if the battery charging level of battery 40.

Step 555: checking if the battery charging level of the battery is bellow a preconfigured threshold level.

Controller 110 checks if the battery charging level of battery 40 is bellow a preconfigured threshold level.

If the battery charging level of the battery is above a preconfigured threshold level, go to Step 505.

Step 560: activating the auxiliary alternator.

Controller 110 has determined that the battery charging level of the battery is not above a preconfigured threshold level, and the charging amperage is not above a preconfigured amperage threshold.

Controller 110 activates the auxiliary alternator 160 to join the vehicle's alternator 60 in charging the vehicle's battery 40, go to Step 505.

(end of battery charging method 500)

Figure 6:
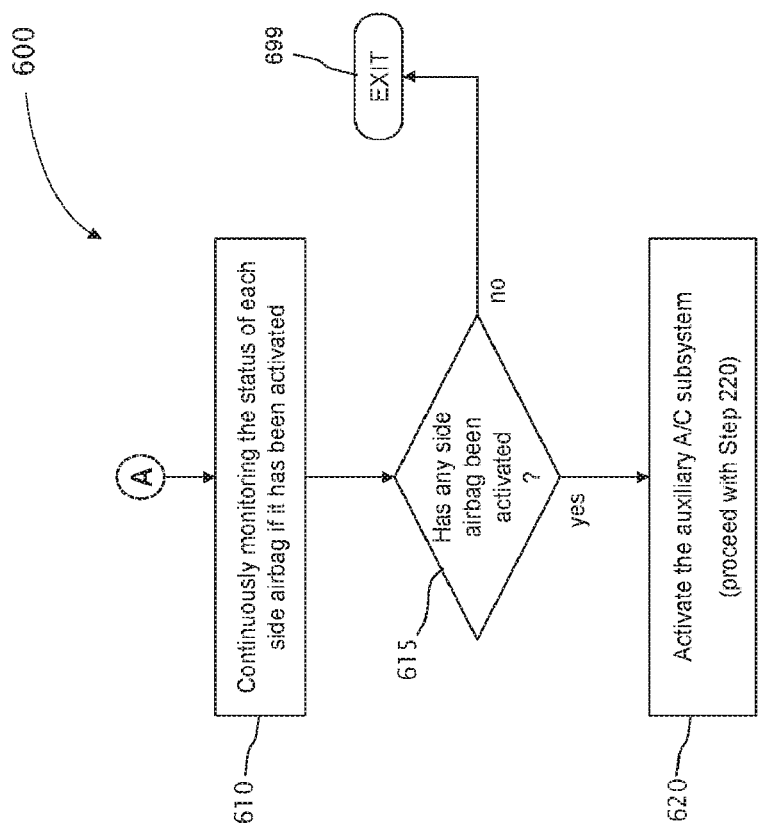
FIG. 6 is a schematic flowchart diagram of a side-impact-accident air conditioning method, according to some embodiments of the present invention.

Reference is now also made to FIG. 6, showing a schematic flowchart diagram of a side-impact-accident air conditioning method 600, according to some embodiments of the present invention. Method 600 is operable independently or integrally with either vehicle air conditioning method 300 or vehicle air conditioning method 400, wherein, for example, the steps of sub-method 600 are performed before or after Step 315 or 415, respectively. Accident air conditioning sub-method 600 proceeds as follows:

Step 610: continuously monitoring the status of each of the vehicle's side airbags.
   Controller 110 continuously monitors the side airbags of the vehicle.
Step 615: checking if any of the vehicle's side airbags has been activated.
   Controller 110 continuously checks if any side airbag has been activated.
   The activation of a side airbag indicates that a passenger may be lock inside the vehicle.
   If no side airbag has been activated, go to Step 699.
Step 620: activating the auxiliary A/C system.
   Controller 110 has determined that a side airbag has been activated.
   Go to Step 320 or 420 of vehicle air conditioning method 300 or 400, respectively.
Step 699: exit.
(end of accident air conditioning method 600)

Figure 7:
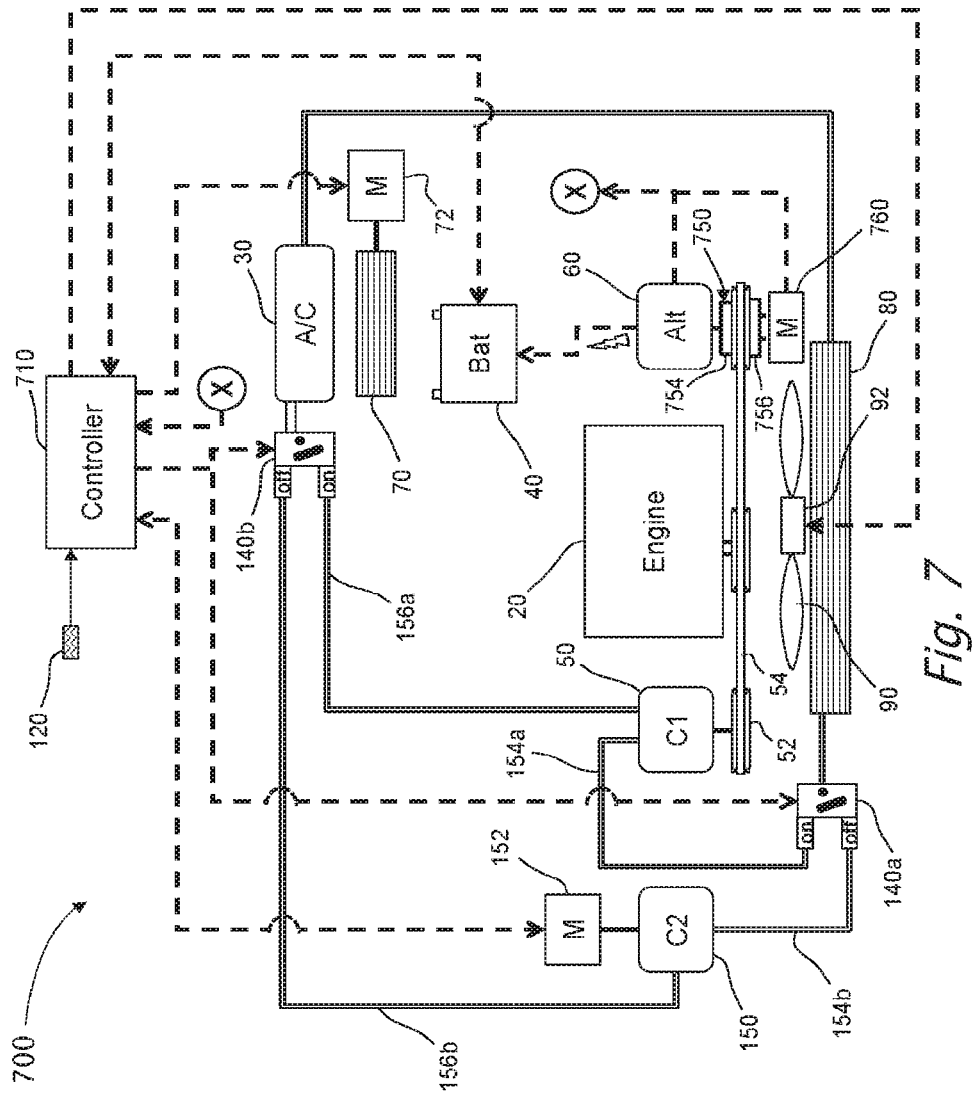
FIG. 7 is a general schematic block diagram illustration of the components of an auxiliary battery charging and vehicle air conditioning system, wherein the vehicle's primary engine is a fuel powered engine, the system including an electricity-supply-interface apparatus, according to some embodiments of the present invention.

Reference is now made to the drawings. FIG. 7 is a schematic block diagram illustration of the components of a vehicle electric and air conditioning system 700, according to embodiments of the present invention, including electricity-supply-interface apparatus 750 and an alternative alternator-motor 760, the alternative alternator-motor 760 being typically, with no limitations, a stepper-type electric motor.

Vehicle electric and air conditioning system 700 operates similarly to auxiliary air conditioning system 100, except that the vehicle's alternator 60 may be operated by either the vehicle's primary engine (20, 25) or by alternative alternator-motor 760. Hence, auxiliary electric and air conditioning system 700 includes an auxiliary controller 710, a cabin-temperature sensor 120, the vehicle's air-condition (A/C) unit 30 having a thermal expansion valve, a pair of electric relay switches 140, the vehicle's A/C compressor 50, an auxiliary compressor 150 coupled to be operated by a motor 152, the vehicle's alternator 60 that may optionally be replaced by a different alternator, and the vehicle's battery 40. Auxiliary controller 710 remains operable when the primary engine is turned OFF.

Auxiliary electric and air conditioning system 700 is designed to cool down the passengers' cabin, when the vehicle's primary engine 20 is turned OFF. Controller 710 monitors the ambient temperature inside the cabin is utilizing cabin-temperature sensor 120. Upon detecting that the ambient temperature inside the cabin is above a preconfigured threshold temperature, controller 710 activates the auxiliary electric and air conditioning system 700 to drive the temperature inside the cabin bellow the preconfigured threshold temperature.

Typically, as in auxiliary vehicle air conditioning system 100, the vehicle's air-condition system utilizes gas vapor that flows in a closed loop. The pair of electric relay switches 140, which work in parallel, are set to allow either the vehicle's compressor 50 or the auxiliary compressor 150 to compress the gas vapor refrigerant in a closed loop. In normal operation, when the vehicle's air conditioning system operates in order, the pair of electric relay switches 140 are set to allow the vehicle's compressor 50 to flow the compressed gas vapor flow towards a condenser 80 via a first forwarding pipe 154a, and to allow returning gas vapor to flow from A/C unit 30 back to the vehicle's compressor 50 via a first returning pipe 156a. Similarly, when the auxiliary air conditioning system is operated, the pair of electric relay switches 140 are set to allow the auxiliary compressor 150 to flow the compressed gas vapor flow towards condenser 80 via a second forwarding pipe 154b, and to allow returning gas vapor to flow from A/C unit 30 back to the auxiliary compressor 150 via a second returning pipe 156b.

When the vehicle's primary engine 20 is turned OFF, controller 710 monitors the ambient temperature inside the cabin is utilizing cabin-temperature sensor 120. Upon detecting that the ambient temperature inside the cabin is above a preconfigured threshold temperature, controller 710 activates the pair of electric relay switches 140, both in parallel, such as to disengage vehicle compressor 50, and engage the auxiliary air-conditioning sub-system.

Preferably, motor 152 that is coupled to operate auxiliary compressor 150, is a stepper electric motor. By using a stepper electric motor, when disengaging either the vehicle compressor 50 or the auxiliary compressor 150, no return pressure is built in the pipes channeling the pressurized gas vapor.

Figure 8A:
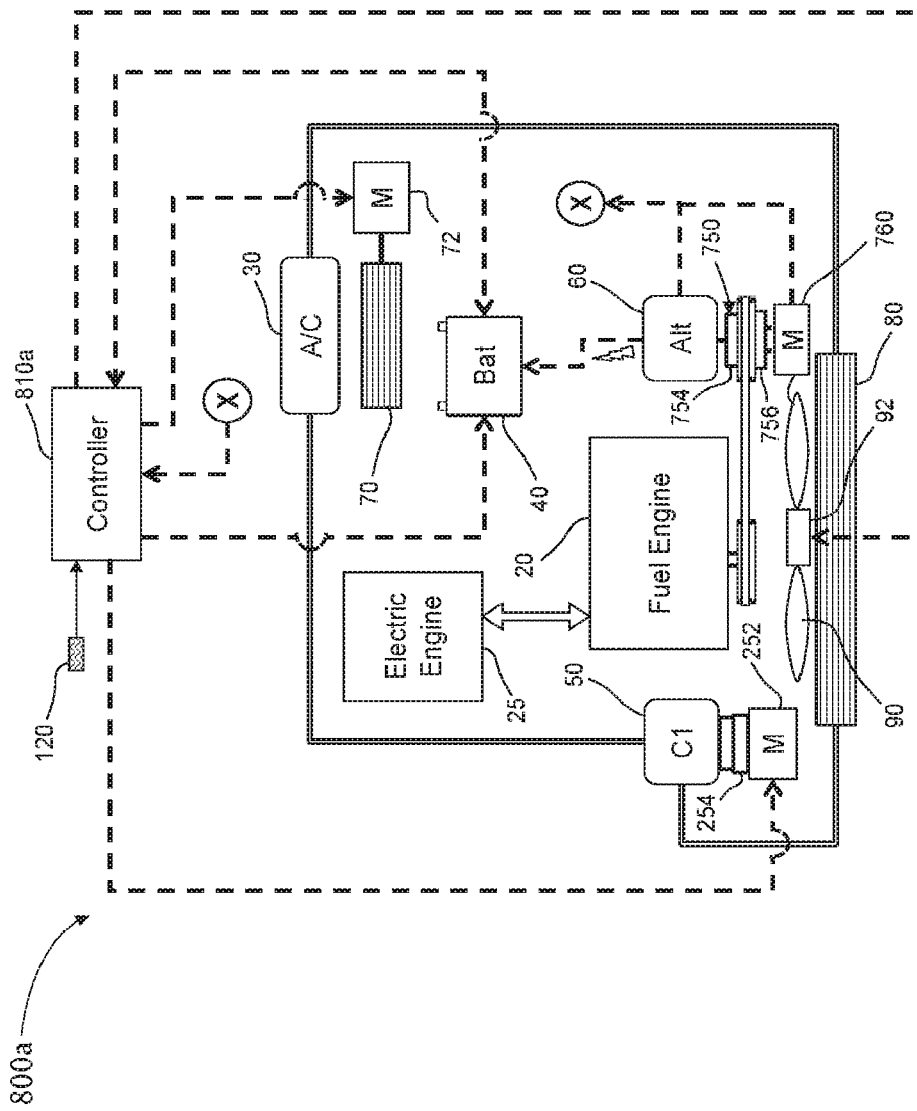
FIG. 8a is a general schematic block diagram illustration of the components of an auxiliary battery charging and vehicle air conditioning system, wherein the vehicle's primary engine is a hybrid powered engine, the system including an electricity-supply-interface apparatus, according to some embodiments of the present invention.

Reference is also made to FIG. 8a, showing a general schematic block diagram illustration of the components of a vehicle electric and air conditioning system 800a, according to some embodiments of the present invention, including an electricity-supply-interface apparatus 750 and an alternative alternator-motor 760. Auxiliary electric and air conditioning system 700 includes an auxiliary controller 710, a cabin-temperature sensor 120, the vehicle's air-condition (A/C) unit 30, the vehicle's A/C compressor 50, the vehicle's alternator 60 that may optionally be replaced by a different alternator 60, and the vehicle's battery 40. Alternator 60 is constantly and continuously operated by the vehicle's hybrid powered engine (20, 25) typically via a belt 54 and a plain pully 62, configured to operate alternator 60 (see FIG. 2a).

Vehicle electric and air conditioning system 700 is further designed, when the primary engine (20 and/or 25) is turned OFF, to charge the vehicle's battery 40 upon determining that the battery 40 is bellow a preconfigured threshold level.

Figure 8B:
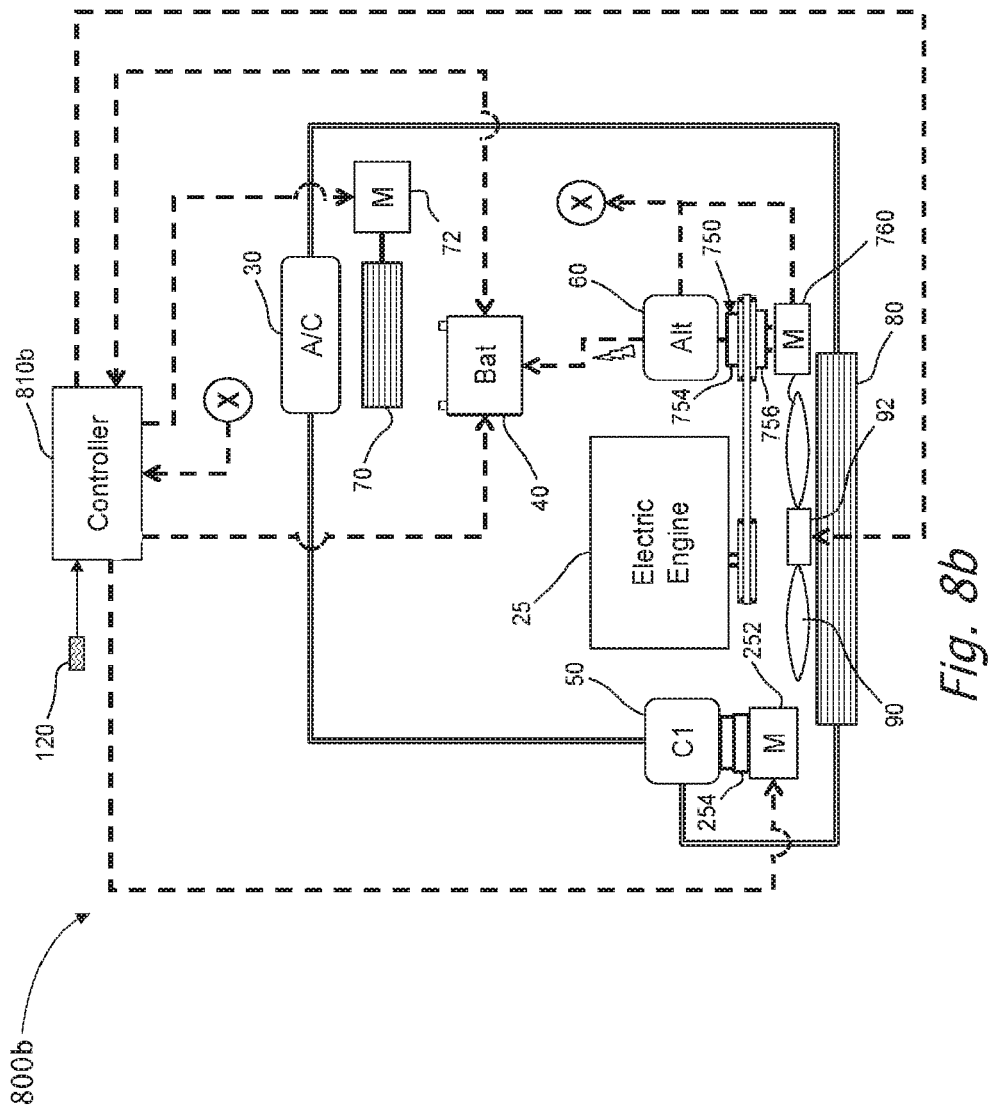
FIG. 8b is a general schematic block diagram illustration of the components of an auxiliary battery charging and vehicle air conditioning system, wherein the vehicle's primary engine is a hybrid powered engine, the system including an electricity-supply-interface apparatus, according to some embodiments of the present invention.

Reference is also made to FIG. 8b, showing a general schematic block diagram illustration of the components of a vehicle electric and air conditioning system 800b, according to some embodiments of the present invention, including an electricity-supply-interface apparatus 750 and an alternative alternator-motor 760. Electric and air conditioning system 700 includes an auxiliary controller 710, a cabin-temperature sensor 120, the vehicle's air-condition (A/C) unit 30, the vehicle's A/C compressor 50, the vehicle's alternator 60, and the vehicle's battery 40. In normal operation, the vehicle's alternator 60 is constantly and continuously operated by the vehicle's electric powered engine 25, typically via a belt 54 and a plain pully 62, configured to operate (see FIG. 2b).

According to the electricity-supply-interface apparatus 750 based embodiments of the present invention, the conventional plain pully 62 is replaced by electricity-supply-interface apparatus 750, configured to provide electricity both when the vehicles primary engine (20 and/or 25) is turned either ON or OFF.

Reference is now also made to FIGS. 9a-18, illustrating an example electricity-supply-interface apparatus 750, according to embodiments of the present invention.

Figure 10:
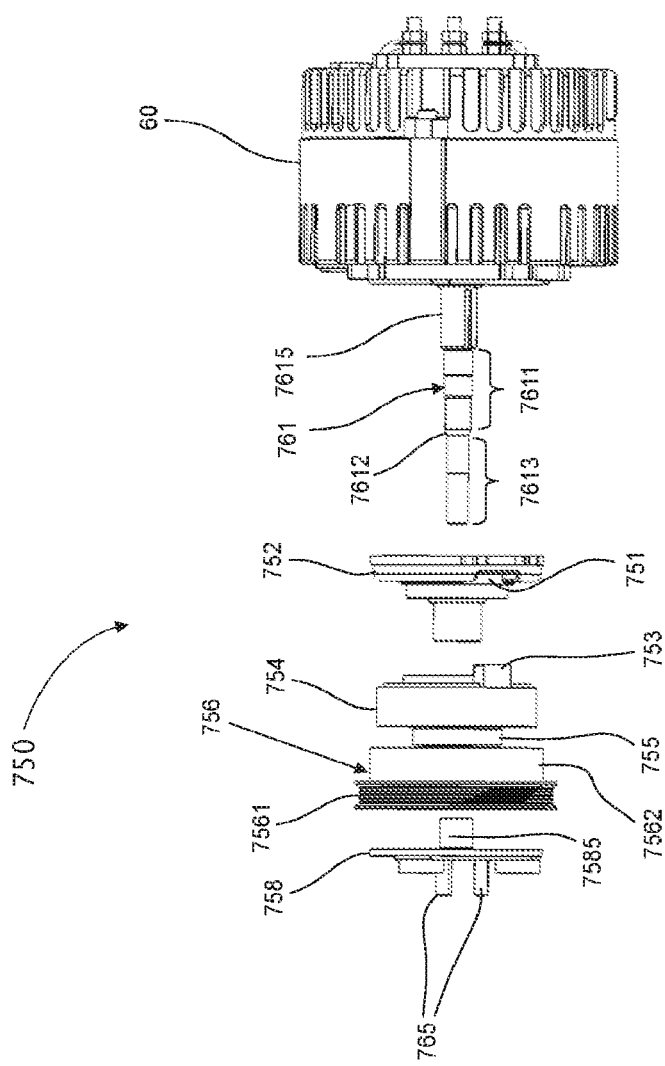
FIG. 10 is an exploded side perspective view illustration of the electricity-supply-interface apparatus, interfaced with the vehicle's alternator, according to embodiments of the present invention.
Figure 11A:
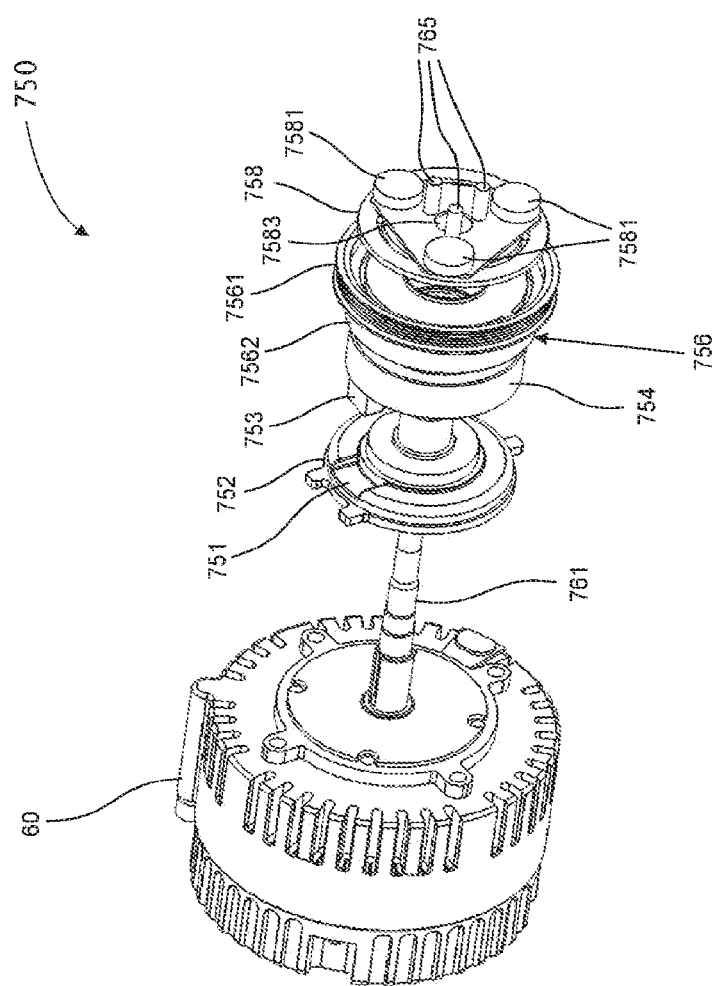
FIG. 11a is an exploded side-front perspective view illustration of the electricity-supply-interface apparatus, interfaced with the vehicle's alternator, according to embodiments of the present invention.
Figure 11B:
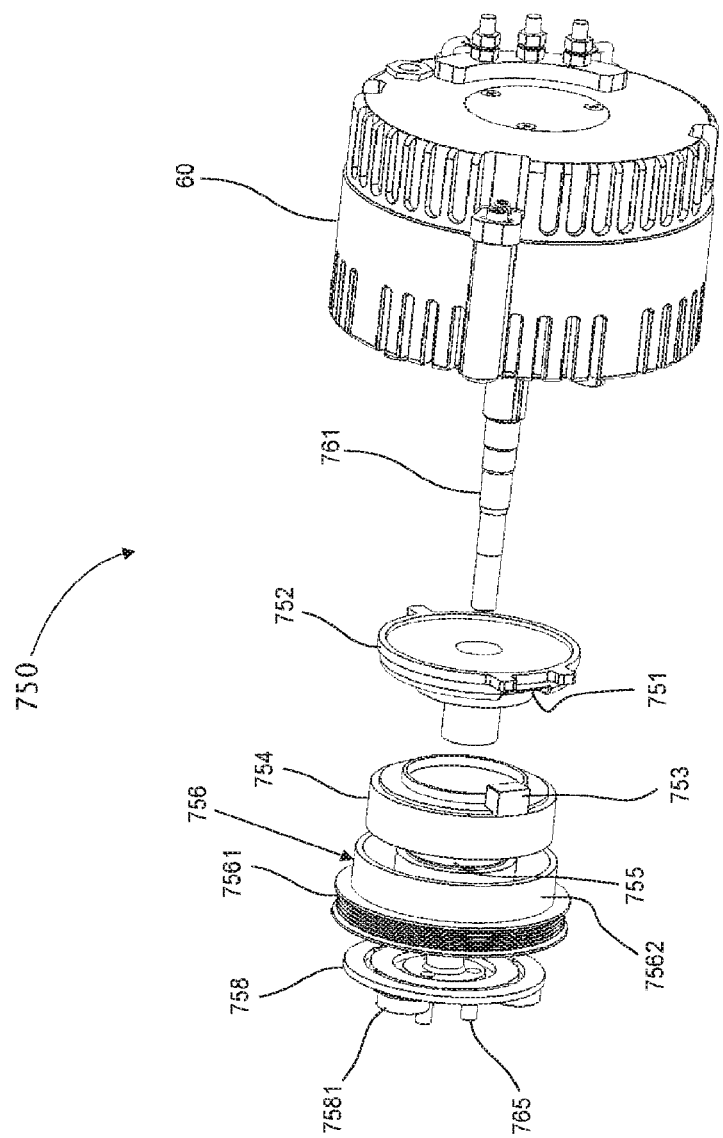
FIG. 11b is an exploded side-rear perspective view illustration of the electricity-supply-interface apparatus, interfaced with the vehicle's alternator, according to embodiments of the present invention.

FIG. 9a illustrates a front perspective view of assembled example of electricity-supply-interface apparatus 750, interfaced with the vehicle's alternator 60. FIG. 9b is a rear perspective view illustration of the assembled example of electricity-supply-interface apparatus 750, interfaced with the vehicle's alternator 60. FIG. 10 is an exploded side view illustration of electricity-supply-interface apparatus 750, interfaced with the vehicle's alternator 60, according to embodiments of the present invention. FIG. 11a is an exploded front perspective view of electricity-supply-interface apparatus 750, interfaced with the vehicle's alternator 60, according to embodiments of the present invention. FIG. 11b is an exploded rear perspective view of electricity-supply-interface apparatus 750, interfaced with the vehicle's alternator 60, according to embodiments of the present invention.

Electricity-supply-interface apparatus 750 includes an interface-shaft 761, a magnetic-insulator 752, an electromagnet 754, a bearing unit 755, a rotor unit 756 and a rotational-motion-receiving-unit 758. Interface-shaft 761 includes a wide rear portion 7611 and a narrower front portion 7613, wherein a step 7612 is formed therebetween the wide rear portion 7611 and the narrower front portion 7613 (see, for example FIG. 10).

FIGS. 12 and 13a-13b are exploded side perspective views illustration of rotor unit 756, showing bearing unit 755 being securely fitted in bore 7565 at the center of rotor unit 756, according to embodiments of the present invention. FIG. 13c is a rear perspective view illustration of rotor unit 756, while FIG. 13d is a front perspective view illustration of rotor unit 756.

Rotor unit 756 further includes a pully section 7561 configure to operatively receive belt 54, wherein pully section 7561 is located on the circumferential surface of rotor unit 756, typically with no limitations, at the side facing alternative alternator-motor 760. Rotor unit 756 further includes an annular groove 7567 configure to receive the annularly shaped electromagnet 754, wherein annular groove 7567 is typically located, with no limitations, at the side facing alternator 60. Annular groove 7567 terminates at divider-wall 7564, that subdivides the cylindrical inner space of rotor unit 756. The hollow space 7569 formed on the other, frontal side of divider-wall 7564, is configured to accommodate rotational-motion-receiving-unit 758. At least two co-annular-through-slotted segments 7563 are formed in divider-wall 7564, which co-annular-through-slotted segments 7563 are configured to accommodate driving pins 765 (see, for example, FIGS. 9a and 11a).

FIG. 14 is a front exploded perspective view illustration of electromagnet 754, and magnetic-insulator 752, according to embodiments of the present invention. On the side facing magnetic-insulator 752, electromagnet 754 include a protrusion 753 that is operatively facing a dent 751, formed in the face of magnetic-insulator 752 facing electromagnet 754, wherein dent 751 is configured to operatively and fittingly accommodate protrusion 753.

FIG. 15 is a front exploded perspective view illustration of rotor unit 756 and rotational-motion-receiving-unit 758, according to embodiments of the present invention. FIG. 16 is a rear perspective view illustration of rotational-motion-receiving-unit 758, according to embodiments of the present invention. Rotational-motion-receiving-unit 758 includes a rotational-plate 7582, having at least two balancing weighs 7581 attached thereon, at least one driving pin 765 and a shaft-attachment-member 7585.

FIG. 17 is a rear perspective view illustration of rotational-motion-receiving-unit 758 being securely attached to a first (front) end of interface-shaft 761 via shaft-attachment-member 7585, and the vehicle's alternator 60 being securely attached to the second (rear) end of interface-shaft 761 via shaft-attachment-member 7615 (see, for example FIG. 10), according to embodiments of the present invention.

Figure 18:
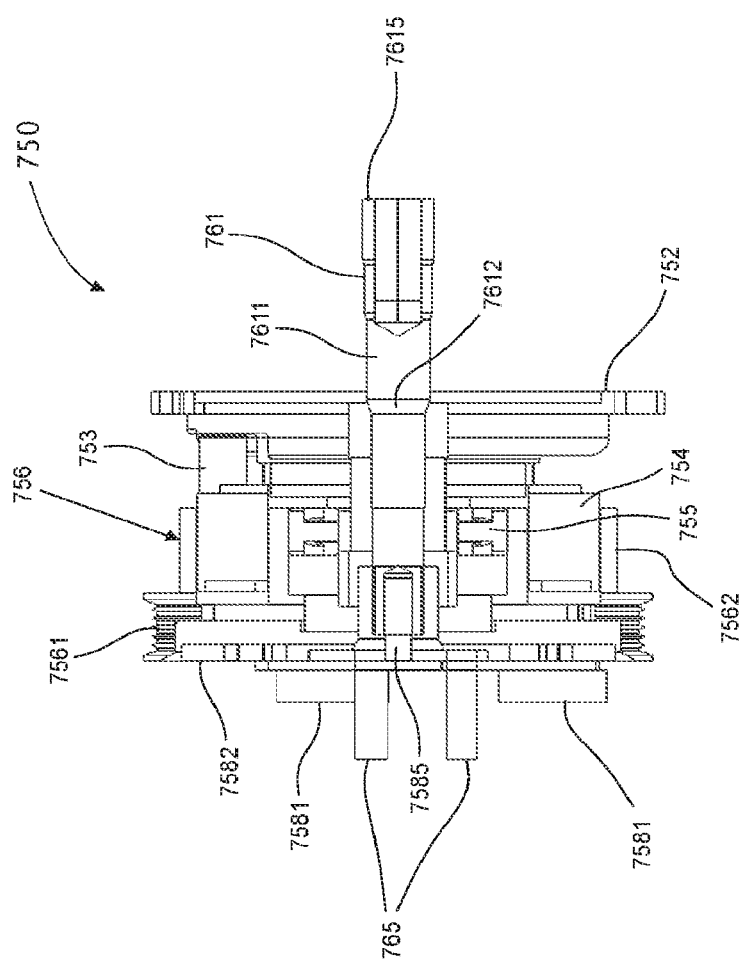
FIG. 18 is a side cross section AA' view of the assembled electricity-supply-interface apparatus, according to embodiments of the present invention.

FIG. 18 is a side cross section AA' view of the assembled electricity-supply-interface apparatus 750, according to embodiments of the present invention. When assembling electricity-supply-interface apparatus 750, rotational-motion-receiving-unit 758 is securely attached to the first (front) end of interface-shaft 761 and the vehicle's alternator 60 is securely attached to the second (rear) end of interface-shaft 761, as shown in FIG. 17 and described hereabove, rotational-motion-receiving-unit 758 is configured to receive rotational motion either from the vehicle's primary engine (20, 25) or from alternative alternator-motor 760. Hence, when rotational-motion-receiving-unit 758 receives rotational motion, the rotational motion is transferred via securely attached interface-shaft 761 to the vehicle's alternator 60, to thereby generate electricity to provide electric power to various units of the vehicle, including the vehicle's A/C system, the auxiliary controller (710, 810), as well as charging the vehicle's battery 40.

When electricity-supply-interface apparatus 750 is assembled, magnetic-insulator 752 is operatively positioned adjacently to step 7612, serving as a stopper to, preventing magnetic-insulator 752 from moving towards the vehicle's alternator 60. Electromagnet 754 is positioned adjacently to magnetic-insulator 752, protrusion 753 is accommodated inside dent 751. Cylindrical electromagnet 754 is further accommodated inside annular groove 7567 of rotor unit 756. Rotational-motion-receiving-unit 758 is accommodated inside the hollow space 7569 formed at the frontal side of divider-wall 7564.

Referring back also to FIGS. 7, 8a and 8b, when the vehicle's primary engine (20, 25) is operating, the auxiliary controller (710, 810) activates electromagnet 754 to thereby forcefully attach, by the formed magnetic field, the rotational-motion-receiving-unit 758 to rotor unit 756. Furthermore, driving pins 765 are forced to move, by a preconfigured distance towards electromagnet 754, through the respective co-annular-through-slotted segments 7563 that are formed in divider-wall 7564.

The activated primary engine (20, 25) drives belt 54, that is operatively engaged with the circumferential surface of pully section 7561, to thereby rotate rotor unit 756 about bearing unit 755. The rotating rotor unit 756 rotates driving pins 765 and thereby rotate rotational-motion-receiving-unit 758. Rotational-motion-receiving-unit 758 rotates the securely attached interface-shaft 761 and the vehicle's alternator 60. The activated alternator 60 generate electricity to provide electric power to various units of the vehicle, including the vehicle's A/C system, the auxiliary controller (710, 810), as well as charging the vehicle's battery 40.

It should be noted that magnetic-insulator 752 is made of non-magnetized materials, such as Aluminum, to prevent the magnetic field, formed by electromagnet 754, from imposing unwanted damages.

When the vehicle's primary engine (20, 25) is turned OFF, the auxiliary controller (710, 810) deactivates electromagnet 754 to thereby relief rotational-motion-receiving-unit 758 from rotor unit 756, including relieving driving pins 765 the move back by a biasing force such as a spring, bringing driving pins 765 to a position in which alternative alternator-motor 760 may engage driving pins 765, using a mechanical interface, for example mechanical interface 762 having through bores 7628 configured to receive driving pin 765, to thereby rotate rotational-motion-receiving-unit 758. Rotational-motion-receiving-unit 758 rotates the securely attached interface-shaft 761 and the vehicle's alternator 60. The activated alternator 60 generate electricity to provide electric power to various units of the vehicle, including the vehicle's A/C system, the auxiliary controller (710, 810), as well as charging the vehicle's battery 40.

Figure 19:
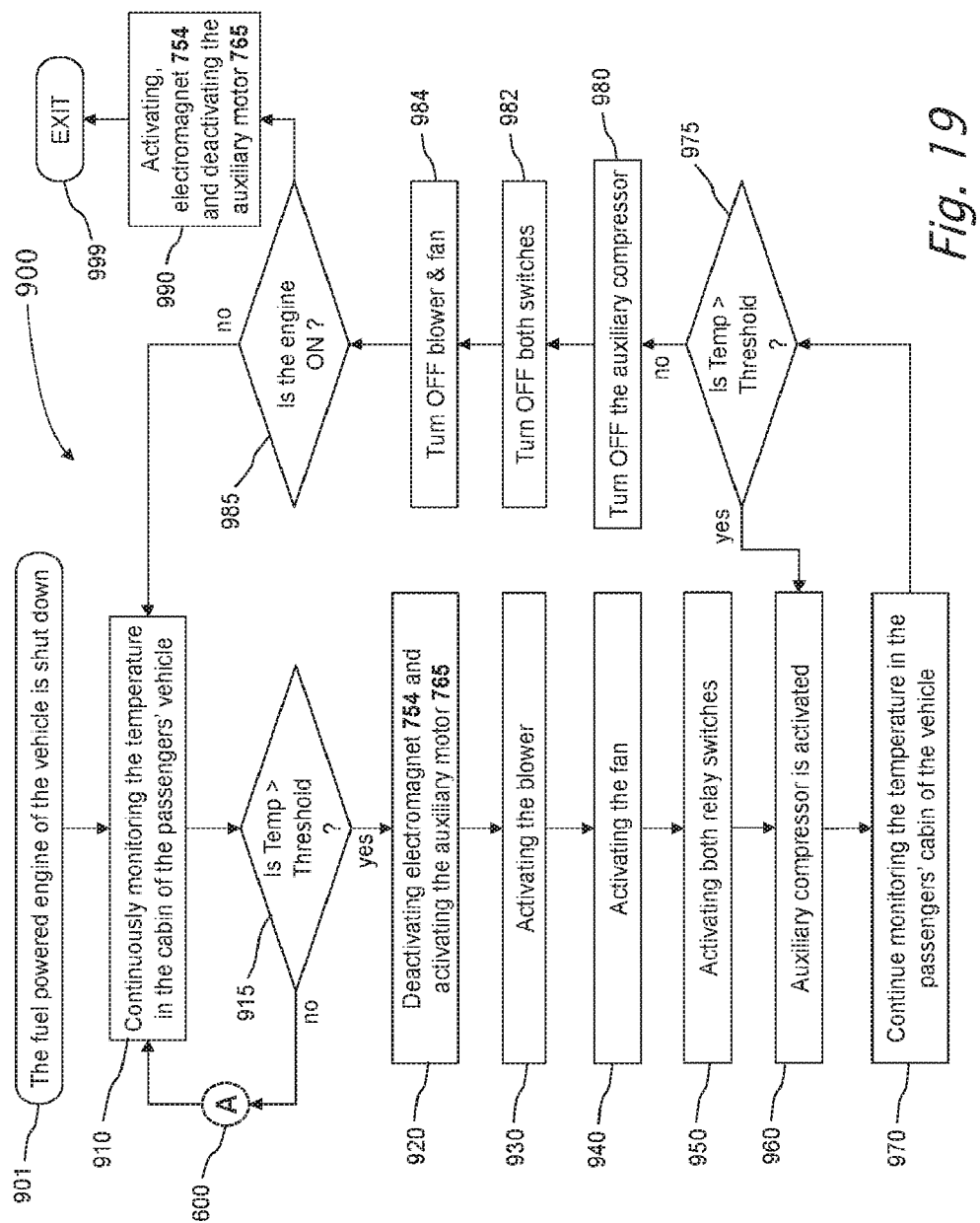
FIG. 19 is a schematic flowchart diagram of a vehicle electric conditioning method, according to some embodiments of the present invention, wherein the method is operable when the vehicle's primary fuel engine is not operating.

Reference is now also made to FIG. 19, showing a schematic flowchart diagram of a vehicle electric conditioning method 900, according to some embodiments of the present invention, wherein method 900 is operable when the vehicle's primary engine is not operating. Upon turning off the vehicle's fuel powered primary engine 20 (Step 901), vehicle electric conditioning method 900 proceeds as follows:

Step 910: continuously monitoring the temperature in the cabin of the vehicle.
    Controller 710 continuously monitors the temperature inside the cabin of the vehicle, using cabin-temperature sensor 120.

Step 915: checking if the ambient temperature inside the cabin is above a preconfigured threshold temperature.
    Controller 710 continuously checks if the ambient temperature inside the cabin is above a preconfigured threshold temperature.
    If the ambient temperature inside the cabin is not above the preconfigured threshold temperature, then:
        optionally, perform accident air conditioning method 600; and go back to Step 910.

Step 920: deactivating the electromagnet and activating the alternative alternator-motor.
    Controller 710 has determined that the ambient temperature inside the cabin is above the preconfigured threshold temperature.
    Controller 710 deactivating the electromagnet 754 and activating the alternative electric alternator-motor 760, to thereby continue activating alternator 60 by alternative electric alternator-motor 760, in order to provide electricity to all required units.

Step 930: activating the blower.
    Controller 710 activates blower 70 by activating the operatively coupled motor 72, for blowing air across the evaporator and the cooled air into the passengers' cabin.

Step 940: activating the vehicle's fan.
    Controller 710 activates vehicle's fan 90 by activating the operatively coupled motor 92.

Step 950: activating both relay switches.
    Controller 710 activates both electric relay switches 140. Thereby, disengage the vehicle compressor 50 and engage the auxiliary air-conditioning sub-system.

Step 960: activating the auxiliary compressor.
    Controller 710 activates auxiliary compressor 150 by activating the operatively coupled motor 152 that will now circulate the gas vapor. Auxiliary compressor 150 substitutes the inactive vehicle compressor 50.
    The air condition is now operating, wherein the auxiliary compressor 150 compresses gas vapor to, typically, flow through condenser 80 to thereby condense the vapor into a liquid. The condensed and pressurized liquid refrigerant is then routed through a thermal expansion valve in the vehicle's A/C unit 30, where the liquid refrigerant undergoes an abrupt reduction in pressure. That pressure reduction results in flash evaporation of a part of the liquid refrigerant, lowering its temperature. The cold refrigerant is then routed through the evaporator coil into the passengers' cabin. Typically, the air is then blown by blower 70 across the evaporator, causing the liquid part of the cold refrigerant mixture to evaporate as well, further lowering the temperature. The warm air is therefore cooled and, in the process, also deprived of any humidity.

It should be noted that alternator 60 continuously supplies electricity to all required units, including charging the vehicle's battery 40.

Step 970: continuously monitoring the temperature in the cabin of the vehicle.
    Controller 710 continuously monitors the temperature in the cabin of the vehicle, using cabin-temperature sensor 120.

Step 975: checking if the ambient temperature inside the cabin is above a preconfigured threshold temperature.
    Controller 710 continuously checks if the ambient temperature inside the cabin is still above a preconfigured threshold temperature.
    If the ambient temperature inside the cabin is still above the preconfigured threshold temperature, go back to Step 970.

Step 980: optionally, turn OFF the auxiliary compressor.
    Controller 710 turns OFF auxiliary compressor 150.

Step 982: turn OFF both switches.
    Controller 710 turns OFF both switches 140.

Step 984: turn OFF the blower and the fan.
    Controller 710 turns OFF blower 70 and fan 90.

Step 985: checking if the vehicle's primary engine is ON.
    Controller 710 checks if the vehicle's primary engine has been turned ON.
    If the vehicle's primary engine is still OFF, go to Step 910.

Step 990: activating the electromagnet and deactivating the alternative alternator-motor.
    Controller 110 has determined that the primary engine 20 has been turned ON.
    Controller 710 activating the electromagnet 754 and deactivating the alternative electric alternator-motor 760, to thereby continue activating alternator 60 by primary engine 20, in order to provide electricity to all required units.

Step 999: exit.
(end of air conditioning method 900)

Figure 20:
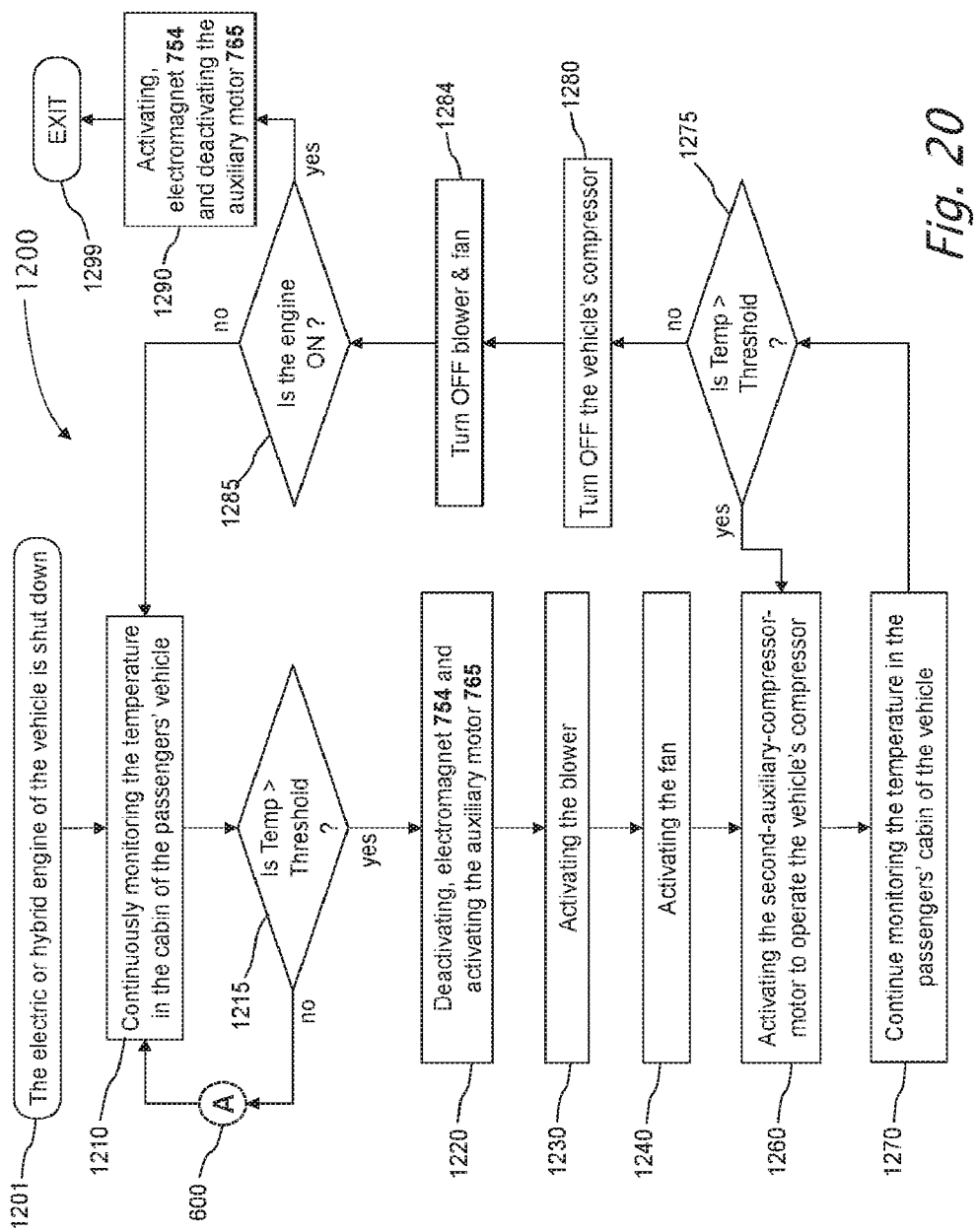
FIG. 20 is a schematic flowchart diagram of a vehicle electric conditioning method, according to some embodiments of the present invention, wherein the method is operable when the vehicle's hybrid or electrical primary engine is not operating.

Reference is now also made to FIG. 20, showing a schematic flowchart diagram of a vehicle electric conditioning method 1200, according to some embodiments of the present invention, wherein method 400 is operable when the vehicle's primary engine is an electric powered engine or a hybrid dual engine (fuel and electric) and is not operating. Upon turning off the vehicle's primary engine (25 or 20&25) (Step 1201), vehicle electric conditioning method 1200 proceeds as follows:

Step 1210: continuously monitoring the temperature in the cabin of the vehicle.
    Controller 810 continuously monitors the temperature inside the cabin of the vehicle, using cabin-temperature sensor 120.

Step 1215: checking if the ambient temperature inside the cabin is above a preconfigured threshold temperature.
    Controller 810 continuously checks if the ambient temperature inside the cabin is above a preconfigured threshold temperature.
    If the ambient temperature inside the cabin is not above the preconfigured threshold temperature, then:
        optionally, perform accident air conditioning method 600; and go back to Step 1210.

Step 1220: deactivating the electromagnet and activating the alternative electric alternator-motor 760 associated with alternator 60.
    Controller 810 has determined that the ambient temperature inside the cabin is above the preconfigured threshold temperature.

Controller 810 deactivating the electromagnet 754 and activating the alternative electric alternator-motor 760, to thereby continue activating alternator 60 by alternative electric alternator-motor 760, in order to provide electricity to all required units.

Step 1230: activating the blower.

Controller 810 activates blower 70 by activating the operatively coupled motor 72, for blowing air across the evaporator and the cooled air into the passengers' cabin.

Step 1240: activating the vehicle's fan.

Controller 810 activates vehicle's fan 90 by activating the operatively coupled motor 92.

Step 1250: activating both relay switches.

Controller 810 activates both electric relay switches 140. Thereby, disengage the vehicle compressor 50 and engage the auxiliary air-conditioning sub-system.

Step 1260: activating the auxiliary compressor.

Controller 810 activates auxiliary compressor 150 by activating the operatively coupled motor 152 that will now circulate the gas vapor. Auxiliary compressor 150 substitutes the inactive vehicle compressor 50.

The air condition is now operating, wherein the auxiliary compressor 150 compresses gas vapor to, typically, flow through condenser 80 to thereby condense the vapor into a liquid. The condensed and pressurized liquid refrigerant is then routed through a thermal expansion valve in the vehicle's A/C unit 30, where the liquid refrigerant undergoes an abrupt reduction in pressure. That pressure reduction results in flash evaporation of a part of the liquid refrigerant, lowering its temperature. The cold refrigerant is then routed through the evaporator coil into the passengers' cabin. Typically, the air is then blown by blower 70 across the evaporator, causing the liquid part of the cold refrigerant mixture to evaporate as well, further lowering the temperature. The warm air is therefore cooled and, in the process, also deprived of any humidity.

It should be noted that alternator 60 continuously supplies electricity to all required units, including charging the vehicle's battery 40.

Step 1270: continuously monitoring the temperature in the cabin of the vehicle.

Controller 810 continuously monitors the temperature in the cabin of the vehicle, using cabin-temperature sensor 120.

Step 1275: checking if the ambient temperature inside the cabin is above a preconfigured threshold temperature.

Controller 810 continuously checks if the ambient temperature inside the cabin is still above a preconfigured threshold temperature.

If the ambient temperature inside the cabin is still above the preconfigured threshold temperature, go back to Step 1270.

Step 1280: optionally, turn OFF the auxiliary compressor.

Controller 810 turns OFF auxiliary compressor 150.

Step 1282: turn OFF both switches.

Controller 810 turns OFF both switches 140.

Step 1284: turn OFF the blower and the fan.

Controller 810 turns OFF blower 70 and fan 90.

Step 1285: checking if the vehicle's primary engine is ON.

Controller 810 checks if the vehicle's primary engine has been turned ON.

If the vehicle's primary engine is still OFF, go to Step 1210.

Step 1290: activating the electromagnet and deactivating the alternative alternator-motor.

Controller 810 has determined that the primary engine (25 or 20&25) has been turned ON.

Controller 810 activating the electromagnet 754 and deactivating the alternative electric alternator-motor 760, to thereby continue activating alternator 60 by primary engine (25 or 20&25), in order to provide electricity to all required units.

Step 1299: exit.

(end of air conditioning method 1200)

Figure 21:
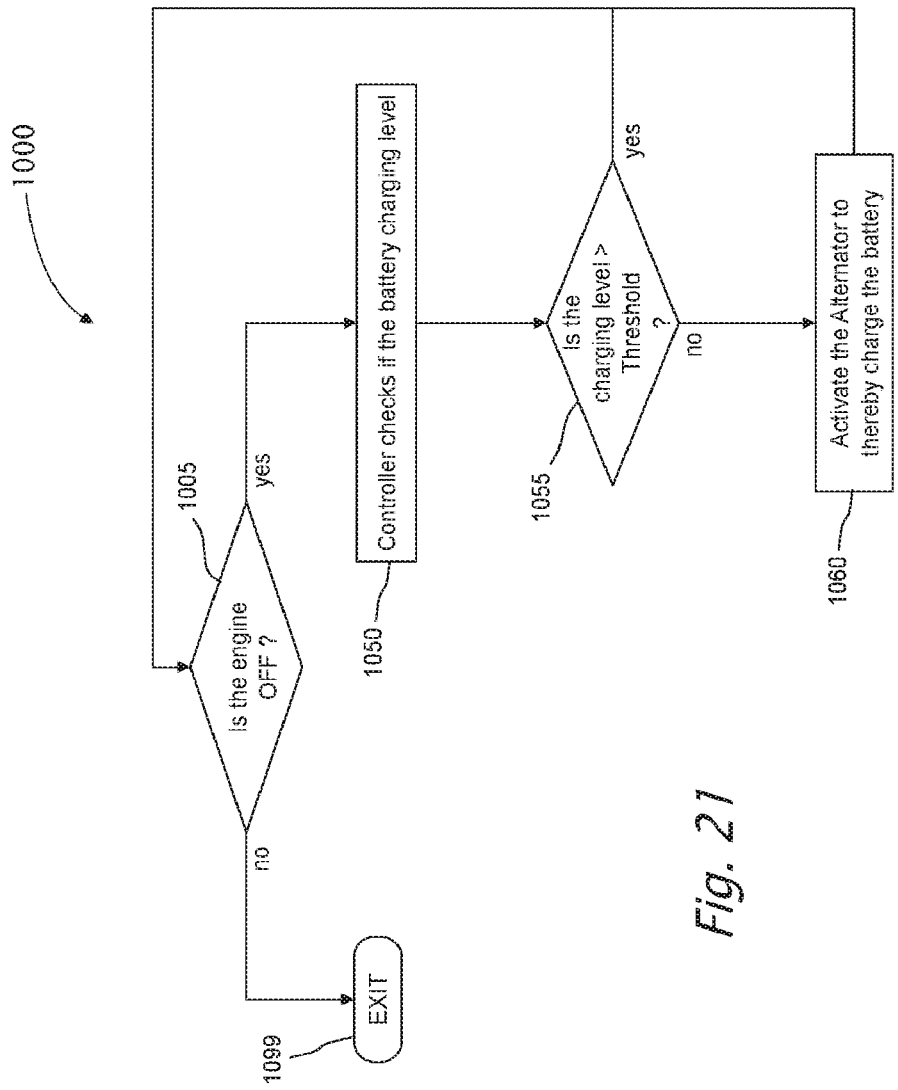
FIG. 21 is a schematic flowchart diagram of a vehicle battery charging method, according to some embodiments of the present invention.

Reference is now also made to FIG. 21, showing a schematic flowchart diagram of a vehicle battery charging method 1000, according to some embodiments of the present invention. Vehicle battery charging method 1000 proceeds as follows:

Step 1005: checking if the vehicle's primary engine is ON or OFF.

Controller (710/810) checks if the vehicle's primary engine is turned ON or OFF.

If the vehicle's primary engine is turned ON, go to Step 1099, to exit.

Step 1050: continuously monitoring the battery charging level.

Controller (710/810) has determined that the vehicle's primary engine 20 is turned OFF.

Controller (710/810) continuously checks if the battery charging level of battery 40.

Step 1055: checking if the battery charging level of the battery is bellow a preconfigured threshold level.

Controller (710/810) checks if the battery charging level of battery 40 is bellow a preconfigured threshold level.

If the battery charging level of the battery is above a preconfigured threshold level, go to Step 1005.

Step 1060: activating the vehicle's alternator.

Controller (710/810) has determined that the battery charging level of the battery is not above a preconfigured threshold level.

Controller (710/810) activates the vehicle's alternator 60 to charge the vehicle's battery 40.

go to Step 1005.

(end of battery charging method 1000)

Figure 22:
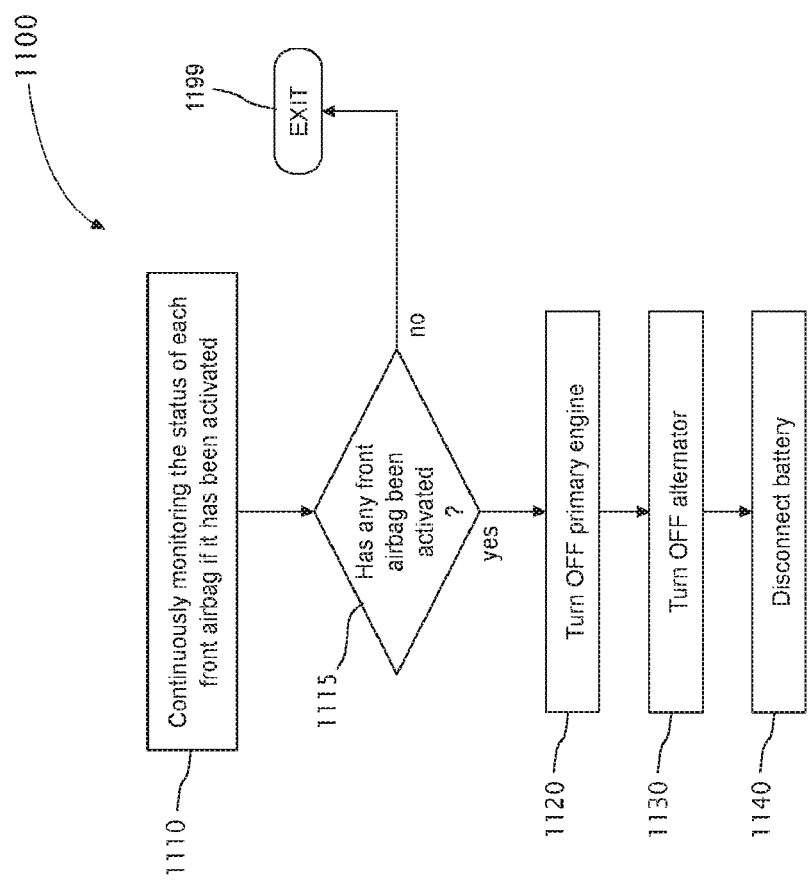
FIG. 22 is a schematic flowchart diagram of a front-impact-accident air conditioning method, according to some embodiments of the present invention.

Reference is now also made to FIG. 22, showing a schematic flowchart diagram of a front-impact-accident air conditioning method 1100, according to some embodiments of the present invention. Accident air conditioning sub-method 1100 proceeds as follows:

Step 1110: continuously monitoring the status of each of the vehicle's front airbags.

Controller (710/810) continuously monitors the front airbags of the vehicle.

Step 1115: checking if any of the vehicle's front airbags has been activated.

Controller (710/810) continuously checks if any front airbag has been activated.

The activation of a front airbag indicates that a passenger may be lock inside the vehicle.

If no front airbag has been activated, go to Step 1199.

Step 1120: turning OFF the primary engine.

Controller (710810) turns OFF the primary engine.

Step 1130: turning OFF the vehicle's alternator.

Controller (710/810) turns OFF the vehicle's alternator 60.

Step 1140: disconnecting the battery.

Controller (710/810) disconnects the vehicle's battery 40, in fear for leaking gasoline.

Step 1199: exit.

(end of accident air conditioning method 1100)

Although the present invention has been described with reference to the preferred embodiment and examples thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the following claims.

What is claimed is:

1. A computerized vehicle controller configured to perform operations, the operations comprising:
   continuously monitoring, using a temperature sensor, a temperature in a vehicle sector;
   upon determining that an ambient temperature inside the vehicle sector is above a threshold while the primary engine is deactivated,
   (a) if a primary engine of the vehicle is a gasoline powered engine, then causing activation of an auxiliary alternator, a blower, a fan, a plurality of electric relay switches to thereby route gas vapor towards an A/C unit, and route returning gas vapor from the A/C unit; and
   (b) if the primary engine is an electric powered engine or the vehicle is operated by a dual-engine configuration, then causing activation of the auxiliary alternator, the blower, the fan and an-auxiliary-motor to thereby activate the A/C unit to drive down the temperature inside the vehicle sector;
   continuously monitoring a status of any one of a vehicle's side air-bags while monitoring the temperature in the vehicle sector; and
   upon determining that any one of the vehicle's side air-bags has been activated, then activating the auxiliary alternator and the auxiliary motor.

2. The computerized vehicle controller of claim 1, the operations further comprising continuing monitoring the temperature in the vehicle sector and determining that the ambient temperature inside the vehicle sector is not above the threshold;
   if the primary engine is the gasoline powered engine, then causing an auxiliary system to deactivate and then deactivate the plurality of electric relay switches, to thereby route gas vapor towards the A/C unit, and route returning gas vapor from the A/C unit; and
   causing deactivation of the auxiliary alternator, the blower, and the fan.

3. The computerized vehicle controller of claim 1, the operations further comprising upon activating the primary engine comprising the gasoline powered engine, causing deactivation of the auxiliary alternator, the blower, the fan and the plurality of electric relay switches so as to route gas vapor towards the A/C unit and route returning gas vapor from the A/C unit.

4. A routing method for a vehicle, comprising:
   continuously monitoring, by a computerized vehicle controller using a temperature sensor, a temperature in a vehicle sector; and
   upon determining, by the controller, that an ambient temperature inside the vehicle sector is above a threshold temperature while the primary engine is in a deactivated state,
   (a) if a primary engine of the vehicle is a gasoline powered engine, then the controller causes activating an auxiliary alternator, a blower, a fan, a plurality of electric relay switches to thereby route gas vapor towards an A/C unit, and route returning gas vapor from the A/C unit to drive down the temperature inside the vehicle sector;
   (b) if the primary engine is an electric powered engine or the vehicle is operated by a dual-engine configuration, then the controller causes activating the auxiliary alternator, the blower, the fan and an-auxiliary-motor to thereby activate the A/C unit to drive down the temperature inside the vehicle sector;
   continuously monitoring a status of any one of a vehicle's side air-baas while monitoring the temperature in the vehicle sector; and
   upon determining that any one of the vehicle's side air-bags has been activated, then activating the auxiliary alternator and the auxiliary motor.

5. The routing method of claim 4, further comprising: continue monitoring the temperature in the vehicle sector and determining that the ambient temperature inside the vehicle sector is not above the threshold temperature,
   if the primary engine is the gasoline powered engine, then the controller causes deactivating an auxiliary system and then the plurality of electric relay switches, to thereby route gas vapor towards the A/C unit, and route returning gas vapor from the A/C unit; and
   deactivating the auxiliary alternator, the blower, and the fan.

6. The routing method of claim 4, further comprising: wherein upon activating the primary engine when the gasoline powered engine, deactivating the auxiliary alternator, the blower, the fan and the plurality of electric relay switches to route gas vapor towards the A/C unit and route returning gas vapor from the A/C unit.

7. The method of claim 4, further comprising: upon activating the primary engine comprising the gasoline powered engine, causing deactivation of the auxiliary alternator, the blower, the fan and the plurality of electric relay switches so as to route gas vapor from a vehicle compressor towards the A/C unit, and route returning gas vapor from the A/C unit towards the vehicle compressor.

8. A vehicle system configured to perform the method of claim 4, the system comprising:
   the computerized vehicle controller;
   the auxiliary alternator;
   the AC unit;
   the temperature sensor;
   the plurality of electric relay switches;
   a mechanically driven air conditioning compressor;
   a condenser that is operatively coupled with the fan;
   a battery configured to be recharged by the auxiliary alternator.

9. The computerized vehicle controller of claim 1, the operations further comprising upon activating the primary engine comprising the gasoline powered engine, causing deactivation of the auxiliary alternator, the blower, the fan and the plurality of electric relay switches so as to route gas vapor from a vehicle compressor towards the A/C unit, and route returning gas vapor from the A/C unit towards the vehicle compressor.

* * * * *